(12) United States Patent
Liu et al.

(10) Patent No.: US 11,071,003 B2
(45) Date of Patent: Jul. 20, 2021

(54) METHODS AND SYSTEMS FOR CONTROL OF WIRELESS CONNECTIONS BETWEEN HOST AND CLIENT DEVICES

(71) Applicant: General Electric Company, Schenectady, NY (US)

(72) Inventors: Jie Liu, Beijing (CN); Joshua Imobersteg, Waukesha, WI (US); Gireesha Rao, Waukesha, WI (US); Scott Wiese, Waukesha, WI (US); Michael Slavkin, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 16/491,619

(22) PCT Filed: Mar. 6, 2017

(86) PCT No.: PCT/CN2017/075720
§ 371 (c)(1),
(2) Date: Sep. 6, 2019

(87) PCT Pub. No.: WO2018/161207
PCT Pub. Date: Sep. 13, 2018

(65) Prior Publication Data
US 2021/0136618 A1 May 6, 2021

(51) Int. Cl.
*H04W 72/08* (2009.01)
*H04W 28/02* (2009.01)
(Continued)

(52) U.S. Cl.
CPC ..... *H04W 28/0236* (2013.01); *H04W 72/044* (2013.01); *H04W 72/082* (2013.01); *H04W 84/12* (2013.01)

(58) Field of Classification Search
CPC .......... H04W 28/0236; H04W 72/044; H04W 72/082; H04W 84/12
See application file for complete search history.

(56) References Cited

U.S. PATENT DOCUMENTS 7,224,697 B2 5/2007 Banerjea et al.
8,781,075 B2 7/2014 Liu et al.
(Continued)

FOREIGN PATENT DOCUMENTS

| CN | 103596228 A | 2/2014 |
|---|---|---|
| CN | 105898877 A | 8/2016 |
| EP | 0866628 A2 | 9/1998 |

OTHER PUBLICATIONS

ISA State Intellectual Property Office of the People's Republic of China, International Search Report and Written Opinion Issued in Application No. PCT/CN2017/075720, dated Dec. 1, 2017, WIPO, 7 pages.

*Primary Examiner* — Brian P Cox

(57) ABSTRACT

Methods and systems are provided for wirelessly communicating between a host device and a client device in a radio frequency (RF) environment. In one embodiment, a wireless communication method for a host device in a RF environment may comprise: communicating wirelessly between the host device and a client device by way of a first RF channel; continuously scanning available RF channels of the RF environment; and in response to a first RF channel signal quality decreasing below a threshold signal quality, selecting one of the available RF channels having a signal quality greater than the threshold signal quality, and switching wireless communication between the client device and the host device from the first RF channel to the selected available RF channel. In this way, reducing interference with the RF environment while lowering a risk of disrupting the
(Continued)

wireless communication between the host device and the client device can be achieved.

21 Claims, 10 Drawing Sheets

(51) Int. Cl.
*H04W 72/04* (2009.01)
*H04W 84/12* (2009.01)

(56) References Cited

U.S. PATENT DOCUMENTS

| | | | | |
|---|---|---|---|---|
| 2003/0195016 A1* | 10/2003 | Periyalwar | ............ | H04W 16/28 |
| | | | | 455/562.1 |
| 2011/0149759 A1* | 6/2011 | Jollota | ................... | A61B 5/002 |
| | | | | 370/252 |
| 2011/0166689 A1* | 7/2011 | Alden | ................. | G05B 23/0275 |
| | | | | 700/108 |
| 2011/0268023 A1* | 11/2011 | Srinivasan | .......... | H04L 65/1086 |
| | | | | 370/328 |
| 2012/0177183 A1 | 7/2012 | Liu et al. | | |
| 2013/0077522 A1* | 3/2013 | Iyama | ................. | H04W 52/225 |
| | | | | 370/252 |
| 2013/0185786 A1* | 7/2013 | Dyer | .................... | H04L 61/2589 |
| | | | | 726/12 |
| 2013/0278081 A1* | 10/2013 | Chien | ................... | G06F 1/3206 |
| | | | | 307/121 |
| 2013/0336140 A1 | 12/2013 | Ma | | |
| 2015/0341869 A1* | 11/2015 | Sen | ..................... | H04W 52/367 |
| | | | | 455/522 |
| 2016/0345336 A1* | 11/2016 | Tchigevsky | ......... | H04L 61/6022 |
| 2017/0188363 A1* | 6/2017 | Ellinikos | ........... | H04W 72/0453 |
| 2017/0280458 A1* | 9/2017 | Lou | ....................... | H04W 76/10 |

* cited by examiner

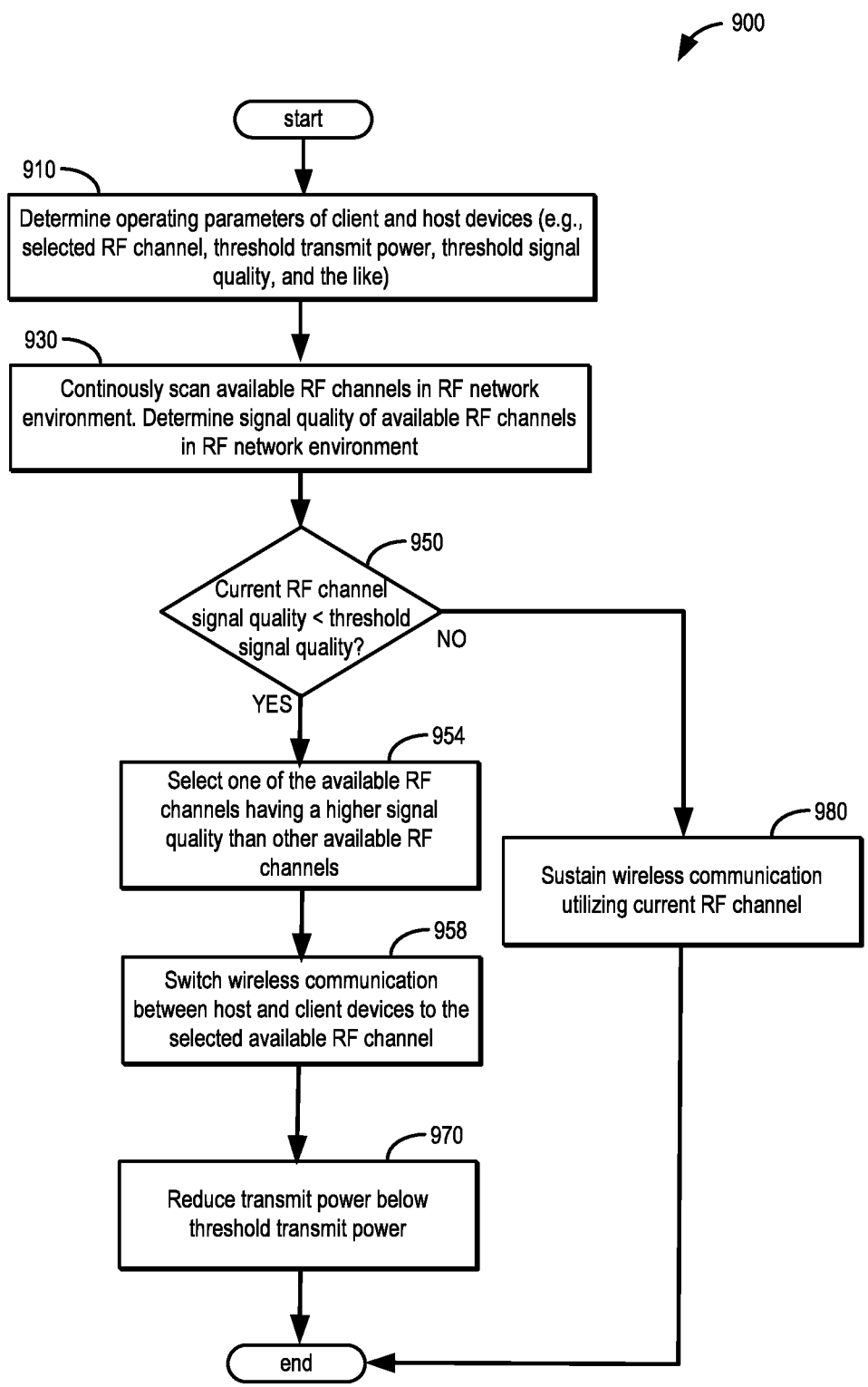

METHODS AND SYSTEMS FOR CONTROL OF WIRELESS CONNECTIONS BETWEEN HOST AND CLIENT DEVICES

FIELD

Embodiments of the subject matter disclosed herein relate to systems and methods for wirelessly communicating between a host device and a client device in an RF environment, and more particularly to systems and methods for wirelessly communicating between a host device and a client device in a Wi-Fi network environment.

BACKGROUND

Point-to-point wireless communication between host devices and their client devices often occurs within the context of a broader Wi-Fi network environment. Access points are employed by the host and client devices to access available radio frequency (RF) channels of the Wi-Fi network. For example, wireless medical devices such as x-ray machines, ultrasound machines, and patient monitoring equipment may utilize point-to-point wireless signaling to receive data transmissions from their data acquisition systems (such as detectors, probes, monitors, and the like) over RF channels in the presence of a hospital Wi-Fi network environment. However, Wi-Fi network environments such as hospital wireless networks can already be extremely congested and prone to interference. For example, host and client devices connecting to the Wi-Fi network environment by way of rogue or soft access points can overwhelm an available RF channel therein, thereby preventing or slowing the transfer of wireless information. In a hospital Wi-Fi network environment, disrupting the wireless transmission of patient health-critical information is undesirable. As such, communication protocols between the host and client devices are commonly restricted to reduce interference or disruption of the broader Wi-Fi network environment. For example, the medical devices may transmit and receive data on a different frequency spectrum or RF channel (such as an ultra-wide band (UWB) channel, a wireless medical telemetry service (WMTS), Bluetooth, medical body area network (MBAN), and the like) from the devices in the hospital network. However, restricting devices to wireless communication on a different frequency spectrum may not be practical since it is more common for portable and non-portable wireless devices to utilize the same 802.11 based wireless communication standards as the Wi-Fi network. Furthermore, restricting devices to communicating on a single channel does not provide for an adaptive approach. In particular, when the signal quality of the chosen channel decreases, wireless communication between the host and client devices can be disrupted. Furthermore, Wi-Fi network environments such as hospital networks are commonly high-traffic, and the availability of unused RF channels with high signal quality can be poor.

Liu et al. (U.S. Pat. No. 8,781,075) describes a method of changing wireless communication channels in a connected host and client system. In one embodiment, the link quality of a connection is monitored by the host or the client. When the connection link quality falls below a predetermined threshold but remains intact, the channel of the system is switched to an arbitrary new channel (e.g., the new channel may be serially selected), and the system resumes communications on the new channel.

The inventors herein have recognized various issues with the above approach. Namely, in some systems, because the new channel is serially chosen from a list of available channels, switching to the new channel may not increase the signal quality of the wireless communication between the host and client devices. In particular, available channels having poor signal qualities (e.g., signal qualities lower than a threshold signal quality) are not disqualified from being selected. As a result, a risk of wireless communication between the host and client devices interfering with and being interfered with by the RF environment is increased. Furthermore, monitoring the link quality of a host-client wireless connection without monitoring other available Wi-Fi channels reduces a responsiveness of the system because a risk of selecting a new channel with poor signal quality may be increased; in some cases, the system may undergo multiple channel switches before a channel with a higher signal quality is found, thereby increasing a duration during which wireless communication can be interrupted. Furthermore, there is no mechanism for mitigating interference between the host and client devices and other devices wirelessly communicating by way of the Wi-Fi network. For example, in a congested Wi-Fi environment such as a hospital Wi-Fi network, switching to the new channel may disrupt existing wireless communication between medical devices in the hospital Wi-Fi network.

BRIEF DESCRIPTION

In one embodiment, the above issues may be at least partially addressed by a wireless communication method for a host device in a radio frequency (RF) environment, comprising: communicating wirelessly between the host device and a client device by way of a first RF channel; continuously scanning available RF channels of the RF environment; and in response to a first RF channel signal quality decreasing below a threshold signal quality, selecting one of the available RF channels having a signal quality greater than the threshold signal quality, and switching wireless communication between the client device and the host device from the first RF channel to the selected available RF channel.

In another embodiment, A wireless communication system for a medical device may comprise: a client device; a host device in wireless communication over a first radio frequency (RF) channel with the client device within an RF environment; and a management module, including executable instructions thereon to, continuously scan a plurality of RF channels of the RF environment, the plurality of RF channels including the first RF channel and a second RF channel; and in response to a second RF channel signal quality being greater than a first RF channel signal quality, switch wireless communication between the client device and the host device from the first RF channel to the second RF channel.

In another embodiment, a wireless communication method for a host device in a Wi-Fi network environment may comprise: conducting wireless communication between a client device and the host device by way of a first radio frequency (RF) channel; continuously monitoring a signal quality of a plurality of RF channels of the Wi-Fi network environment, the plurality of RF channels including the first RF channel and a second RF channel; and in response to a first RF channel signal quality decreasing below a threshold signal quality, switching wireless communication between the client device and the host device from the first RF channel to the second RF channel wherein a second RF channel signal quality is greater than the threshold signal quality.

In this way, the technical effect of reducing interference with the Wi-Fi network environment while reducing a risk of disrupting the point-to-point wireless communication between the host device and the client device can be achieved. In particular, by continuously scanning available RF channels, a responsiveness of the wireless communication method can be increased because the selected available channel to which the host-client wireless communication is switched has a high signal quality. Furthermore, continuously scanning available RF channels can increase the adaptability of the wireless communication in a congested network environment since the method is not restricted to selecting an unused RF channel; existing RF channels within the network environment may be selected as long as the signal quality is adequate. Further still, continuously monitoring available channels in the Wi-Fi network environment may increase a robustness of the wireless communication method since RF channels that tend to have poor signal quality can be avoided. Further still, wireless local area network (WLAN) administrators of the Wi-Fi network environment may be more receptive to permitting use of the host and client devices within the Wi-Fi network environment because a risk of interfering with wireless communication between other devices within the Wi-Fi network is reduced. As such, the adaptive selection of the channel through continuous scanning provides substantial advantages in contrast to a serial selection or a static selection. Further still, the systems and methods described herein allow for wireless communication between the host and client devices to be flexibly customized to and compliant when operating within Wi-Fi environments where the number of available channels for wireless communication is restricted (e.g., geographic or user-defined restrictions) to a subset of channels by the WLAN administrator.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below:

FIGS. 4, 5, 6, and 9 show flow charts of example wireless communication methods for the wireless communication systems of FIGS. 1, 2A, and 2B.

DETAILED DESCRIPTION

The following description relates to systems and methods for wireless communication between a host device and a client device in an RF environment, for example, in a Wi-Fi network environment.

In one embodiment, a wireless communication method for a host device in a radio frequency (RF) environment may comprise: communicating wirelessly between the host device and a client device by way of a first RF channel; continuously scanning available RF channels of the RF environment; and in response to a first RF channel signal quality decreasing below a threshold signal quality, selecting one of the available RF channels having a signal quality greater than the threshold signal quality, and switching wireless communication between the client device and the host device from the first RF channel to the selected available RF channel.

Figure 1:
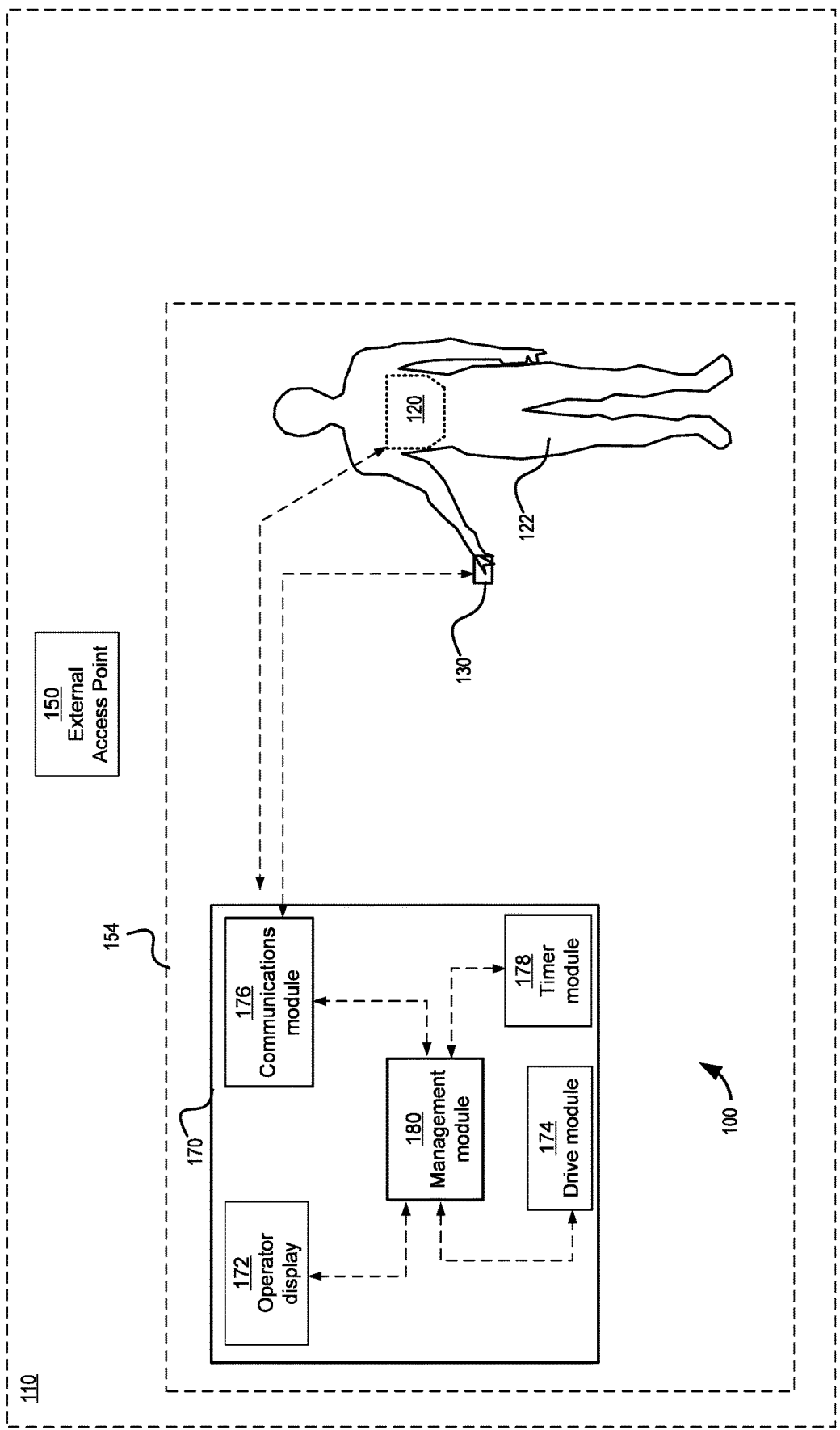
FIG. 1 shows a schematic of an example wireless communication system for a host device and a client device in a Wi-Fi network environment.
Figure 2B:
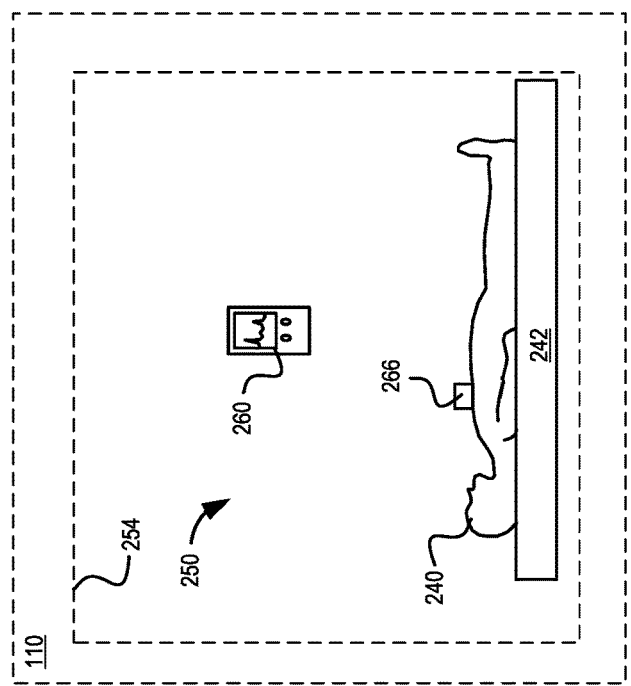
FIGS. 2A and 2B show schematics of wireless communication systems for medical devices within a hospital network environment.
Figure 2A:
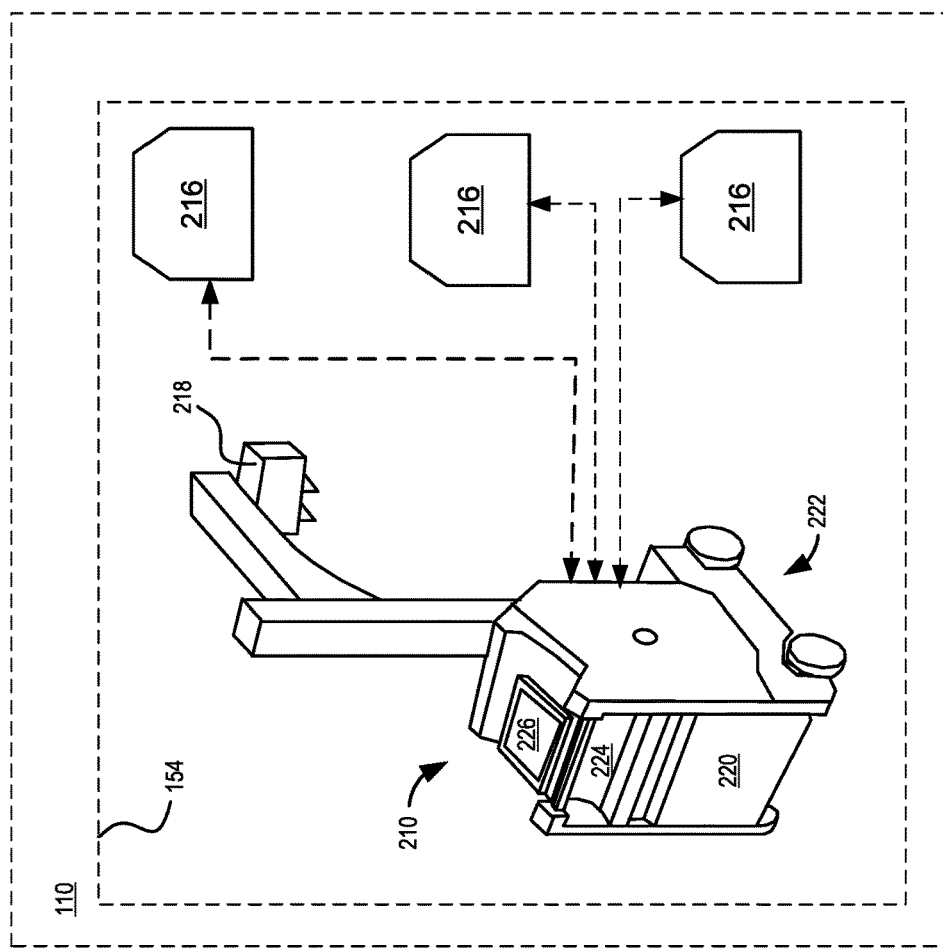
Figure 3A:
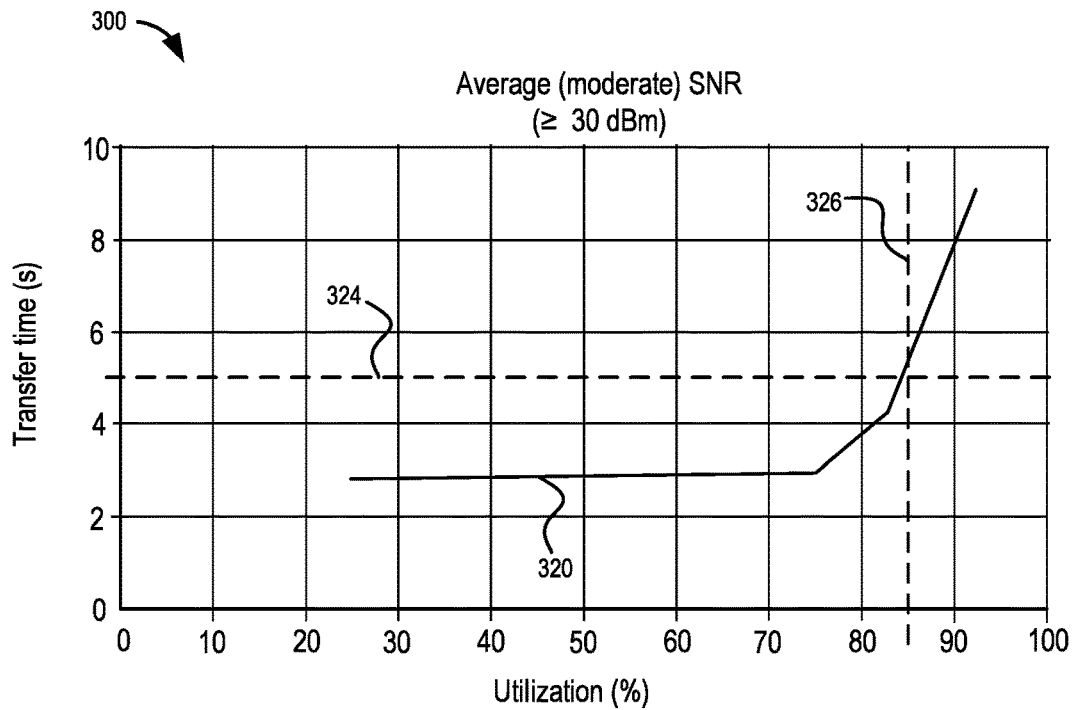
FIGS. 3A-3C show example plots of wireless communication transfer time versus utilization at various signal-to-noise ratios.
Figure 3B:
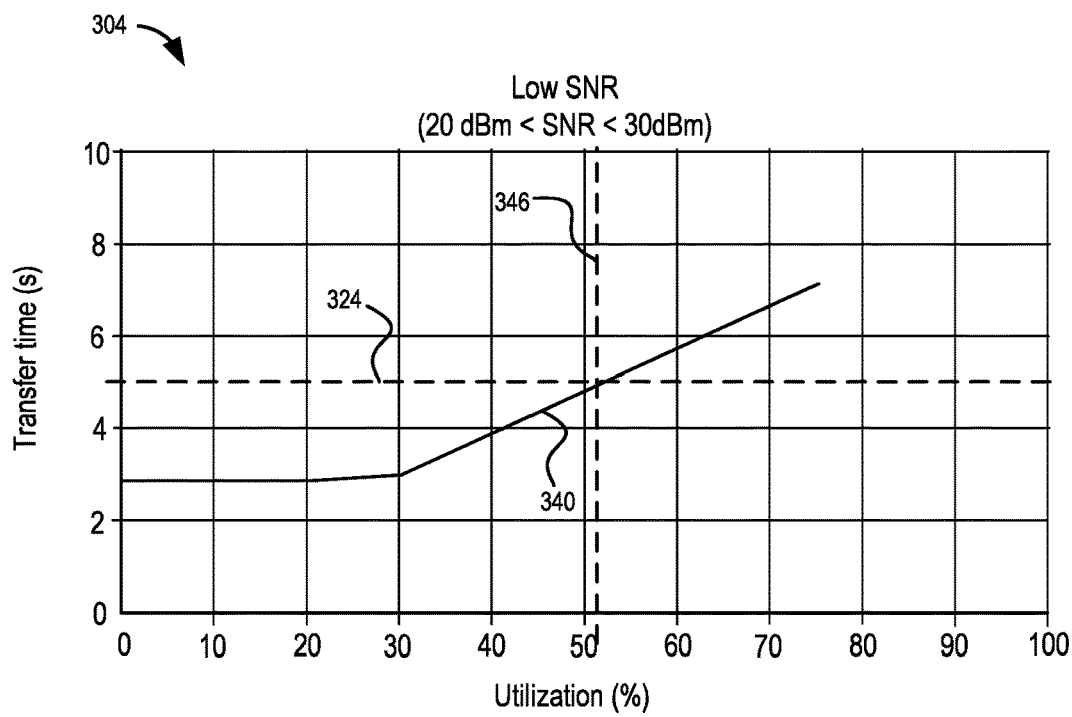
Figure 7:
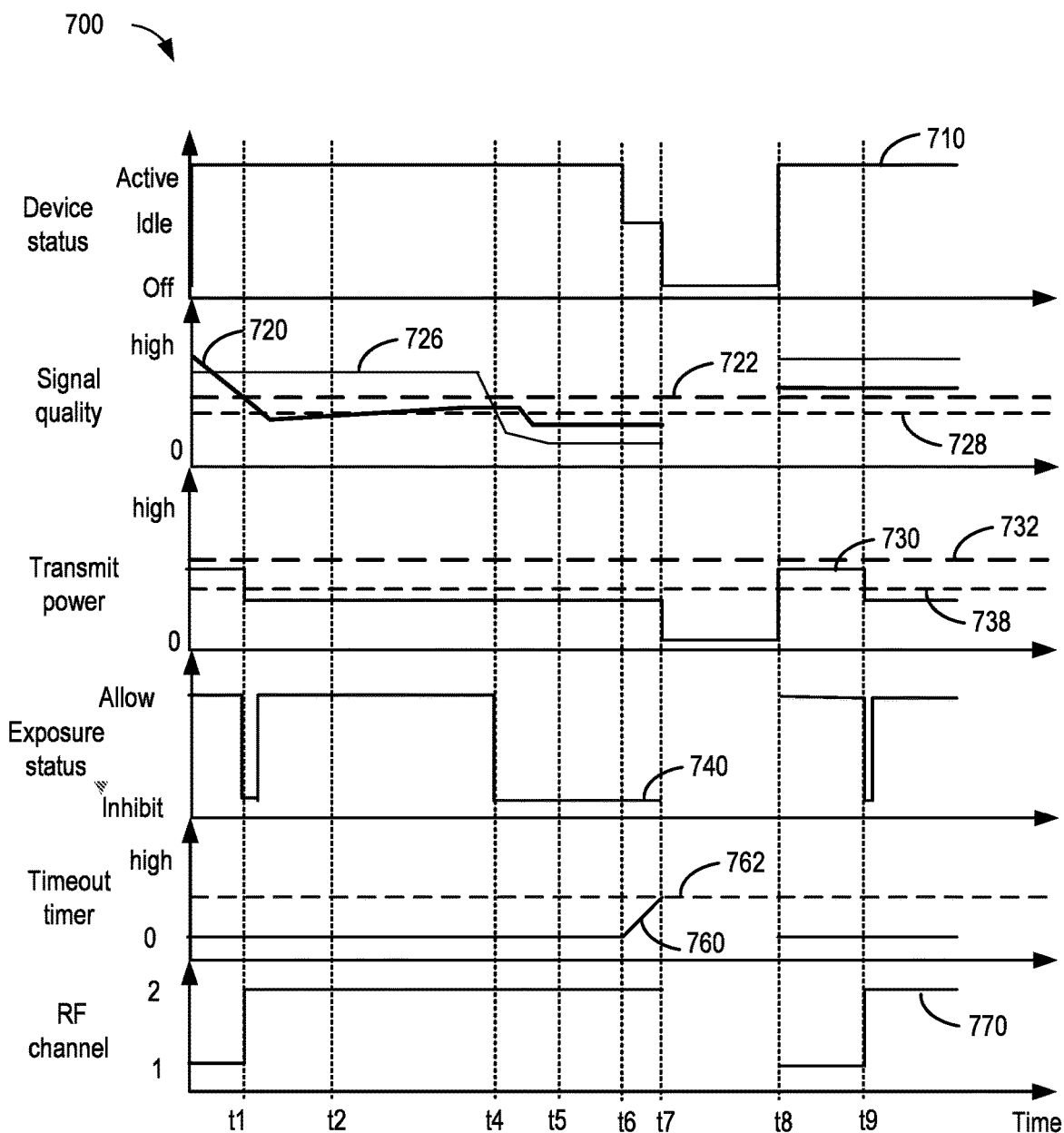
FIG. 7 shows an example timeline for the wireless communication methods of FIGS. 4, 5, 6, and 9 for a host device and a client device in a wireless network environment.
Figure 8B:
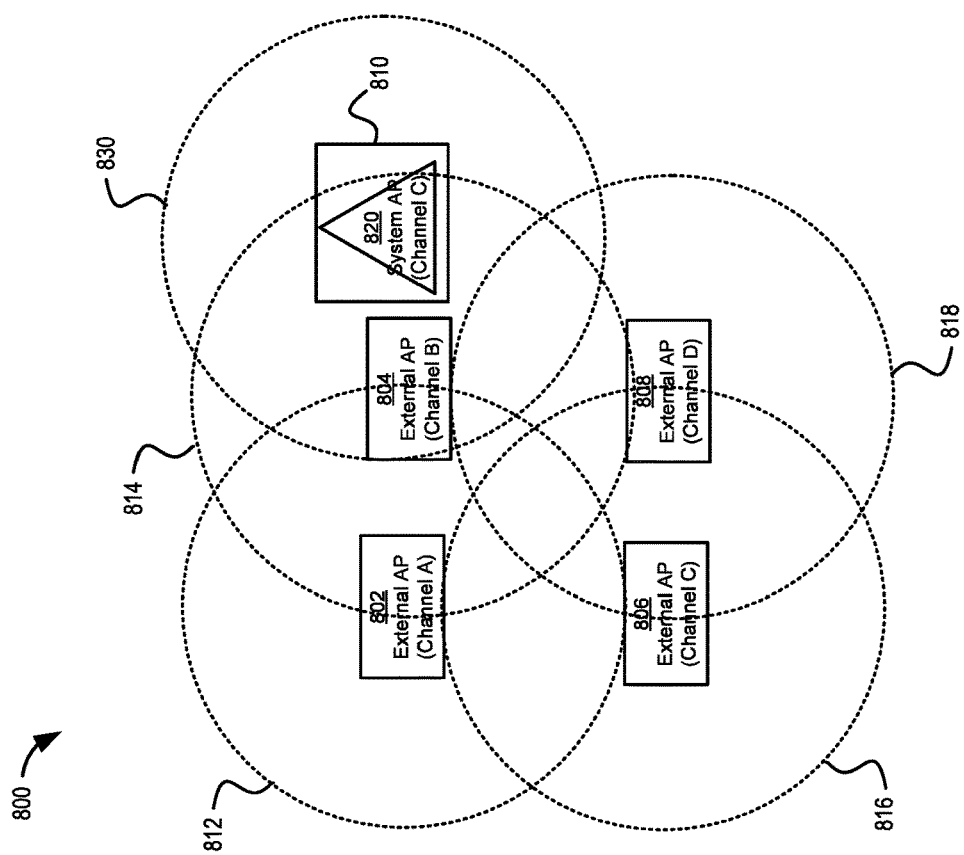
FIGS. 8A and 8B show examples of the wireless communication systems of FIGS. 1, 2A, and 2B operating within a site RF environment.
Figure 8A:
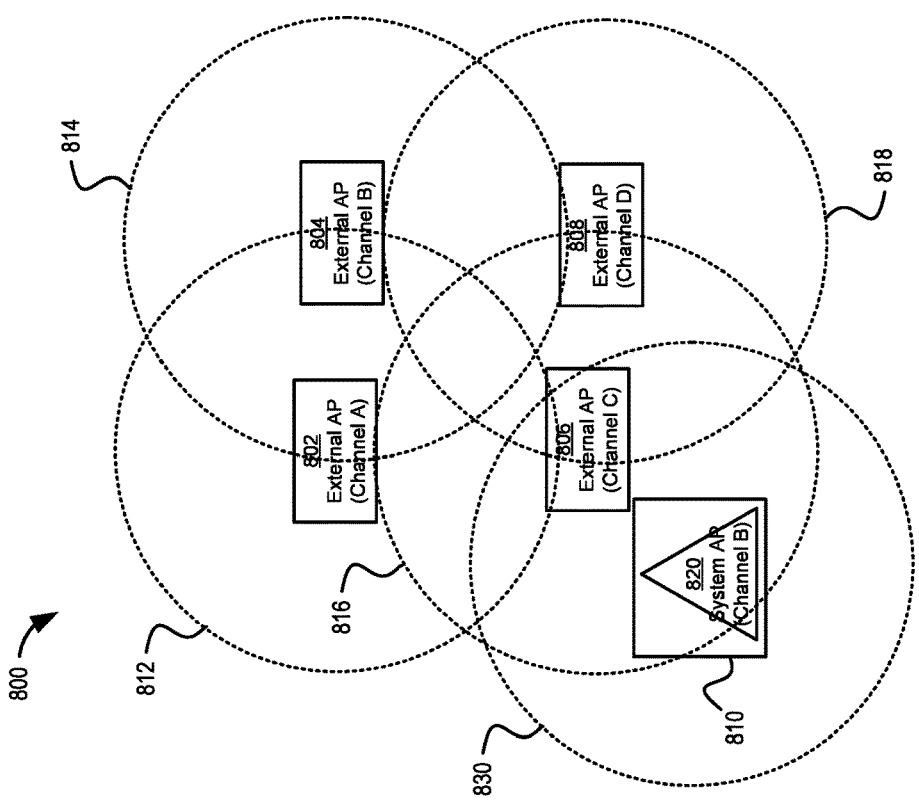

A wireless communication system may wirelessly transmit data between a host device and a client device within a Wi-Fi network environment, as shown in FIG. 1. In some examples, the host device and the client device may include a medical device and a detector, such as an x-ray system or a patient monitoring system, as shown in FIGS. 2A and 2B. FIGS. 8A and 8B illustrate the wireless communication systems of FIGS. 1, 2A, and 2B operating within a broader site Wi-Fi network environment. Various wireless communication methods, as shown in FIGS. 4, 5, 6, and 9 may be executed on board a management module of the wireless communication system. The wireless communication methods may include responsively switching wireless communication channels in response to a signal quality decreasing below a threshold signal quality. The signal quality can be determined from various wireless communication metrics such as received signal strength indicator (RSSI), noise floor, signal-to-noise ratio (SNR), channel utilization, latency, packet loss, retries, and the like. One example of evaluating signal quality and determining threshold signal quality from SNR and channel utilization data is shown in FIGS. 3A-3B. A timeline for the various wireless communication methods of FIGS. 4, 5, 6, and 9 as executed by a wireless communication system, is shown in FIG. 7.

Turning now to FIGS. 8A and 8B, a further examples is provided to illustrate an example wireless communication system 810 operating within a site RF environment 800. It should be appreciated that this examples is provided for illustration purposes and not intended to limit scope. In the example of FIGS. 8A and 8B, the site RF environment 800 is broadcast by four external access points (APs) 802, 804, 806, and 808. The RF environment 800 may include a Wi-Fi network environment, and the access points 802, 804, 806, and 808 may include one or more wireless networking hardware devices such as a wireless router, gateway, switch, and the like. Each of the access points 802, 804, 806, and 808 may broadcast a distinct channel (e.g., A, B, C, and D, respectively) over a coverage region (e.g., as shown by 812, 814, 816, and 818, respectively) that can be utilized by the host and client devices included in the wireless communication system 810. Wireless communication system 810 may further include a system AP 820 that facilitates wireless communication between the host and client devices of the wireless communication system 810 over a coverage region 830.

As shown in FIG. 8A, the coverage region 830 of the wireless communication system 810 overlaps with the coverage regions 812, 816, and 818. Accordingly, the wireless signals broadcast by the system AP 820 can potentially interfere with the wireless signals broadcast by the external APs 802, 806, and 808. Following the systems and methods for wireless communication between host and client devices described below, the wireless communication system 810 may continuously scan and monitor the signal qualities of the available RF channels A, B, C, and D of the RF environment. In one implementation, in response to a threshold signal quality of the RF channel broadcast by the system AP 820 (for wireless communication between host and client devices of the wireless communication system 810) decreasing below a threshold signal quality, the wireless communication system 810 may select one of the available channels having a signal quality greater than the threshold signal quality, and switch wireless communication to the selected available channel. As an example, the selected available channel may have a higher signal quality than the signal qualities of the other available channels. In another example, in response to a signal quality of an available RF channel being greater than the signal quality of the RF channel broadcast by the wireless communication system 810, the wireless communication system 810 may switch to the available RF channel. The signal quality of the available RF channel may be greater than the signal quality of the RF channel broadcast by the wireless communication system 810 by more than a threshold difference.

In the case of FIG. 8A, channel B may have a higher signal quality than channels A, C, and D, and wireless communication system 810 may switch to channel B to avoid interfering with and to avoid being interfered with by any of the external APs 802, 804, 806, and 808. In the case of FIG. 8B, if the wireless communication system 810 maintains wireless communication utilizing channel B, it would interfere with external AP 804. Channel C may have a higher signal quality than channels A, B, and D, and wireless communication system 810 may switch to channel C to avoid interfering with and to avoid being interfered with by any of the external APs 802, 804, 806, and 808.

The wireless communication system 810 may determine signal qualities of the available RF channels based on one or more wireless communication metrics such as RSSI, noise floor, SNR, channel utilization, latency, packet loss, retries, and the like. RSSI indicates the strength of a broadcast signal at its location of measurement. Increasing transmit power from a signal source can increase RSSI, but may cause interference with other device utilizing the same channel for wireless communication at a greater distance from the source. Noise floor provides a measure of the magnitude of background signals. Examples of background signals includes degraded signals broadcast from external sources (e.g., external APs), for example degraded signals from external sources positioned a distance away from the measurement point. SNR is a measure indicating the magnitude of the RSSI relative to the noise floor. When the RSSI and the noise floor are comparable in magnitude, the signal quality is lower (lower SNR) because the broadcast signal is difficult to distinguish from the background noise. Conversely, when the RSSI is much greater than the noise floor in magnitude, the signal quality is higher (higher SNR). For example, switching wireless communication to a channel having a lower noise floor while maintaining RSSI will increase SNR and signal quality.

Channel utilization provides a measure of the percentage of an RF channel's Wi-Fi bandwidth that is being utilized by all active devices in an area. Higher channel utilization indicates more Wi-Fi traffic on an RF channel and lower signal quality, whereas lower channel utilization indicates less Wi-Fi traffic on an RF channel and higher signal quality. Higher channel utilization may be caused by many wireless devices each transmitting/receiving data using a smaller amount of bandwidth, fewer devices each transmitting/receiving data using a larger amount of bandwidth, or a combination thereof. Latency measures the delay in wireless transmission from the time when a device decides to transmit data to the actual time that the device transmits the data. During Wi-Fi communication, wireless devices first "listen" (e.g., monitor) to verify that the RF environment is clear prior to "talking" (e.g., transmitting). In a congested RF environment, where many wireless devices are transmitting on a network, there will be larger latency delays from the time a device decides to transmit data to the actual time that the data transmission from the device occurs. Any response transmissions from other devices would have delay as well. Conversely, in an RF environment with lower traffic, where fewer wireless devices are transmitting on a network, there will be smaller latency delays from the time a device decides to transmit data to the actual time that the data transmission from the device occurs. Thus, large latency delays indicate lower signal quality, whereas small latency delays indicate higher signal quality.

Packet loss occurs when one or more packets of data travelling across a network fail to reach their destination. Packet loss increases (indicating lower signal quality) when network congestion increases; packet loss decreases (indicating higher signal quality) when network congestion is reduced. Packet loss may be measured as a percentage of packets lost with respect to packets sent. Retries measures the number of instances when a transmitting device (e.g., a host or client device) re-transmits a batch of packets responsive to not receiving a return acknowledgment signal from a receiving device (or managing AP). For example, when a wireless device sends a packet (or batch of packets) to another wireless device, the receiving wireless device (or managing AP) returns an acknowledgement (or batch acknowledgement) signal. If the transmitting device does not receive the appropriate acknowledgement (indicating packet loss), then the transmitting device will often re-transmit the lost packet or batch of packets. When the number or frequency of retries increases, the signal quality is lowered.

Turning now to FIG. 1, it illustrates an example wireless communication system 100 including a host device 170 and client devices 120 and 130. Host device 170 may engage in point-to-point wireless communication with client devices 120 and 130 within a broader RF network environment 110. Non-limiting examples of the RF network environment include corporate wireless networks, hospital wireless networks, and public Wi-Fi hotspots. The RF network environment 110 may include a plurality of wireless network access points 150 that provide wireless networking access to wireless devices within the RF network environment. For instance, the RF network environment 110 may be represented by the RF environment 800 of FIGS. 8A and 8B. Each network access point 150 may provide wireless network access to wireless devices within a coverage region 154 surrounding the network access point 150. In some examples, multiple network access points 150 may be positioned in close enough proximity within the Wi-Fi network environment 110 so that their corresponding coverage regions may overlap to avoid any discontinuities in wireless access within the Wi-Fi network environment. Non-limiting examples of the wireless network access points 150 include wireless networking hardware devices such as a wireless router, gateway, switch, and the like. The wireless network access points 150 may be managed by a device which regulates adjustments to their radio frequency (RF) transmission power, the available wireless communication channels (frequencies), authentication, and security. In some examples, each network access point may provide access to different sets of RF communication channels, with different authentication and security protocols. Thus, a wireless device can be provided access to the RF network environment by way of different RF channels and authentication and security protocols depending on a position of a device within a Wi-Fi network environment and its proximity to a particular networking access point.

The host device 170 can include an operator display 172 for interfacing with an operator. As non-limiting examples, the operator display 172 may include devices that can both receive input from the operator and display information to the operator such as a touchscreen. Although not shown in FIG. 1, the host device can further include other input/output devices such as a keyboard, mouse, a printer, a data drive, and the like, for sending and receiving information. The host device 170 may further include a communications module 176 for wirelessly transmitting and receiving data from other wireless devices, including one or more client devices 120 and 130. As non-limiting examples, the client devices 120 and 130 may include data acquisition systems such as sensors, probes, detectors, and the like for transmitting physiological data from a patient 122. Furthermore, the communications module 176 may include a wireless access point on-board the host device 170. The communications module 176 may also transmit and receive data to various network access points 150 within the Wi-Fi network environment 110. Both the operator display 172 and the communications module 176 may send data to and receive instructions from a management module 180. It should be understood that communications module 176, management module 180, timer 178, drive module 174, and display 172 may reside on the same physical device or be separate devices in communication with each other.

The management module 180 may include executable instructions thereon to carry out wireless communication methods between the host device 170 and the client devices 120 and 130, and to solicit input and display output to the operator by way of the operator display 172. The management module 180 may further communicate with a drive module 174. In the case where the host device includes a medical device, the host device may further coordinate management of wireless communication with clinical functions. For example, for an imaging medical device such as an X-ray machine or an ultrasound machine, active exposures (e.g., imaging) may be inhibited during switching of RF channels for wireless communication to reduce a risk of losing image data. Furthermore, active exposures may be resumed following a successful switch to a new channel for wireless communication. In the case of a portable host device, the drive module 174 may provide an indication to the management module of whether the host device 170 is being moved or in transit and the drive module 174 is engaged, or whether the host device 170 is stationary. The host device 170 may further include a timer 178 for tracking the duration of various steps or events of the wireless communication methods. The timer 178 may transmit the duration information to the management module 180 and may further receive instructions from the management module 180, such as when to begin timing and when to stop timing.

The management module 180 may also include executable instructions thereon for monitoring or scanning and switching between various RF channels available to the host and client devices within the Wi-Fi network environment 110. In one example the management module 180 may continuously scan the signal qualities of the available RF channels when the host and client devices are active so that under conditions where the signal quality utilized by the host and client devices is degraded below a threshold signal quality (e.g., due to increased utilization by other devices, increased noise, and the like) the management module 180 can promptly initiate switching communication between the host and client devices to an available RF channel with a higher signal quality. In other examples, even though the signal quality of an RF channel is not degraded, the management module 180 may initiate switching wireless communication between the host and client devices to a different available RF channel having a higher signal quality in order to increase a transmission speed thereof. Further details regarding the functions of the management module 180 related to regulating wireless communication between the host and client devices are included with reference to FIGS. 4, 5, 6, and 9 below. In other examples, the strength of the signal from the communication module 176 and/or any of the plurality of devices 130 and 120 may be lowered to maintain the needed transmission speed but reduce the radiated power to lessen the risk of interfering with the RF environment.

The example wireless communication system of FIG. 1 includes two client devices 120 and 130 in communication with the host device 170, however in other examples one or more client devices may be used. In other example systems, a client device may be in wireless communication with a plurality of host devices. Client devices may include sensors, transducers, cameras, data recorders, probes and other types of data acquiring devices. For example, a medical device such as an x-ray machine may include a base station host device in communication with one or more x-ray detectors, as illustrated in FIG. 2A. In one case, the client devices may include medical device detectors used to acquire and wirelessly transmit medical data for a patient 122. Furthermore, in some example wireless communication systems 100, the wireless client devices may include a management module 180, operator display 172, communications module 176, and the like for regulating wireless communication with the host devices within the Wi-Fi network environment.

Turning now to FIG. 2A, it illustrates a wireless x-ray system 210 as an example embodiment of a wireless communication system 100. The wireless x-ray system 210 is located within a Wi-Fi network environment 110 and a coverage region 154 corresponding to a network access point (not shown). The wireless X-ray system 210 includes a digital X-ray system designed both to acquire original image data and to process the image data for display. In the embodiment illustrated in FIG. 2A, the wireless X-ray system 210 includes an X-ray base station 220 (e.g., host device 170) suitable for communicating with multiple digital X-ray detectors 216 (e.g., client devices 120, 130) located within the operative range of the X-ray base station 220. The X-ray system 210 is configured to coordinate operation of digital X-ray detectors 216. The X-ray base station 220 may be a mobile imaging system or a fixed imaging system. The X-ray base station 220 has an X-ray source 218 and, in conjunction with the digital X-ray detectors 216, is operable to perform X-ray imaging. The X-ray base station 220 may recognize and communicate with the multiple X-ray detectors 216.

In the depicted embodiment, the multiple detectors 216 are in communication with a base station 220. The base station 220 houses electronic circuitry 222 (e.g., management module 180, communications module 176) to wirelessly detect and communicate with the detectors 216, acquire image data from the detectors 216, and process the data to form desired images. The electronic circuitry 222 may further be able to wirelessly scan or monitor wireless network traffic within the Wi-Fi network environment. In particular, the electronic circuitry may wirelessly monitor the signal quality characteristics of available RF channels in the Wi-Fi network environment, and initiate switching wireless communication between the base station 220 and the detectors 216 to a different RF channel having a higher signal quality. In addition, the electronic circuitry 222 both provides and controls power to the X-ray source 218. The base station 220 also has an operator workstation 224 that enables a user operate the wireless X-ray system 210 and monitor various system activities on display 226 (e.g., operator display 172). In one embodiment, in order to wirelessly detect and communicate with the detectors 216, the electronic circuitry 222 and the detectors 216 all possess one or more wireless communication interfaces. In one such embodiment, all wireless interfaces in the base station 220 and detectors 216 may be provided a list of allowed wireless communication channels (e.g., frequencies) that are approved for a particular geographic region or Wi-Fi network environment 110. In another example, the wireless interfaces in the base station 220 and detectors 216 may be provided a subset of the list of allowed wireless communication channels, as determined by the Wi-Fi network environment.

The available RF channels may be determined by one or more of the Wi-Fi network environment, the capabilities of the host and client devices, and the operator. For example, the Wi-Fi network environment may broadcast a set of available Wi-Fi channels and the host and client devices may be able to communicate by way of that set (or a subset) of available Wi-Fi channels. In another implementation, the available Wi-Fi channels may be operator-configurable. For example, an operator may limit wireless communication between host and client devices to a subset of the Wi-Fi channels broadcast by the Wi-Fi network environment to reduce a risk of disrupting the Wi-Fi network environment. In other examples, the set of available Wi-Fi channels may be further determined by a geographical location or region-specific protocol. As a non-limiting example, the host and client devices may wireless communicate by way of 20 MHz channels (e.g., 36, 40, 44, 48, 149, 153, 157, 161, 165, and the like) and/or 40 MHz channels (e.g., 36+, 44+, 149+, 157+, and the like). In some implementations, wirelessly communicating between the host and client devices utilizing 40 MHz channels may provide higher data transfer rates as compared to utilizing 20 MHz channels.

In another embodiment, a wireless patient monitoring system 250 is represented in FIG. 2B, as an example of the wireless communication system 100. In the illustrated embodiment, the wireless patient monitoring system 250 is operable to monitor physical attributes of a patient 240 lying on table 242 using a wireless patient sensor 266 and transmit this data to a patient monitoring base station 260 for processing and display. Accordingly, the wireless patient sensor 266 includes circuitry operable to detect patient temperature, blood pressure, heart rate, and the like. The wireless patient monitoring base station 260 includes circuitry operable to process patient data, determine if any patient attributes are beyond an acceptable level, sound appropriate alarms, and display the processed patient data on a screen. For example, the wireless patient monitoring base station 260 may include a management module (similar to management module 180) capable of continuously monitoring the signal quality of available RF channels for wireless communication, and for switching wireless communication between the patient monitoring base station 260 and the wireless patient sensor 266 to an RF channel having a higher signal quality responsive to the current RF channel having a degraded signal quality below a desired threshold signal quality. Further details regarding the functionality of wireless communication management modules of host and client devices such as the wireless patient monitoring base station 260 are discussed below with reference to FIGS. 4, 5, 6, and 9. In order to wirelessly communicate, the patient monitoring base station 260 and the sensor 266 possess one or more wireless communication interfaces as discussed herein. In one such embodiment, wireless interfaces are provided a list of allowed wireless communication channels that are approved for a particular application or geographic region.

In one implementation, during the operation of a wireless X-ray system 210 or a patient monitoring system 250, the base stations 220 and 260 serve as wireless host devices, and the detectors 216 and sensors 256 serve as wireless client devices, for their respective embodiments. In each embodiment, the host and client wirelessly communicate with one another on a certain RF channel. However, in the case where the RF channel signal quality decreases below a threshold signal quality (e.g., the RF channel becomes too noisy to continue communications on the current channel), the system may initiate a change to a new channel with a higher signal quality in order to reduce a risk of disrupting the wireless communication between the host and client devices while allowing for continuous wireless image and data transfer within a threshold transfer time. In the case of medical devices, to determine if the current channel has become too noisy to continue communications, one or more particular signal quality metrics may be monitored in real time to determine when they have fallen below a predetermined threshold signal quality. These metrics may include, but are not limited to, signal to noise ratio, signal strength, percent utilization of the channel, transfer time for transmitting an amount of data, absolute or relative number (e.g., percentage) of packets that fail data verification, and absolute or relative number (e.g., percentage) of dropped packets. One or more metrics may be monitored individually or in combination by either or both the host or the client device within the system. The predetermined value of a particular threshold signal quality may be determined based on the data throughput and delay requirements and limitations for a particular activity, and may be input or set by a user. Threshold signal quality may vary depending on the RF channel or may be common to different RF channels, depending on the type of signal quality metric.

As a simple example, the signal quality may be indicated by a single metric of signal strength such as noise floor. Under conditions where the noise floor is greater than a threshold noise floor (as predetermined for acceptable wireless communication between the host and client devices), the system may initiate a change to a to a different RF channel in order to reduce a risk of disrupting wireless communication between the host and client devices. A typical value for the noise floor may be from −90 to −98 dBm. In another example, the signal quality may be indicated by a combination of metrics, such as the RSSI and the noise floor. For example, the SNR may be utilized as a metric to indicate RF signal quality; under conditions where the SNR is less than a threshold SNR, the system may initiate a change to a to a different RF channel in order to reduce a risk of disrupting wireless communication between the host and client devices. The threshold SNR may be a predetermined value that provides acceptable wireless communication between the host and client devices. For example, when the SNR is greater than a threshold SNR, the risk of data loss may be reduced and a transfer time for transmitting images or other data between the host and client devices may be reduced. In one implementation, such as within a hospital Wi-Fi network environment, the threshold SNR may be 50 dBm.

Figure 3C:
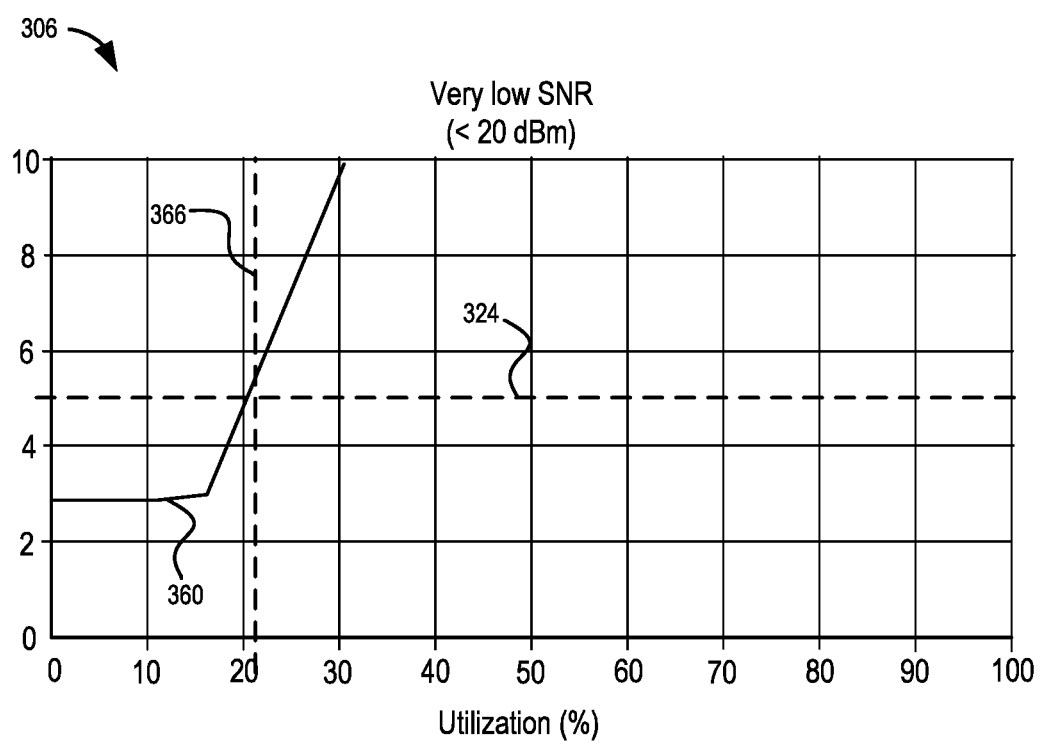

Turning now to FIGS. 3A-3C, they illustrate plots 300, 304, and 306 of transfer time versus channel utilization for various signal-to-noise ratio (SNR) levels generated from wireless communication system performance tests. It should be understood that the plots 300, 304, and 306 are for illustrative purposes and may vary depending on the specific implementation and application. The plots 300, 304, and 306 illustrate one non-limiting example of determining threshold signal qualities based on a combination of three wireless communication metrics: transfer time, channel utilization, and SNR. In other words, transfer time, channel utilization, and SNR data may be mapped to define operating windows based on these parameters for triggering RF channel changes when communicating wirelessly between host and client devices. In other examples, a different combination of one or more wireless communication metrics such as RSSI, noise floor, SNR, channel utilization, latency, packet loss, retries, and the like, may be measured and mapped to define operating windows for triggering RF channel changes when communicating wirelessly between host and client devices. The transfer time may be determined from the difference between the recorded times of the first and last data packet wirelessly transferred between the host and client devices. In another example, the transfer time may be determined from the difference between the recorded times of the first packet transmitted and the last packet received. Threshold transfer times for wireless communication between the host and client devices may be determined based on one or more of host and client device capabilities, the particular application (e.g., x-ray machine, ultrasound machine, patient monitoring, and the like), the Wi-Fi network environment, and standard specifications or protocols for image or data transfer rates in a particular Wi-Fi environment or application.

As a non-limiting example, referring to plots 300, 304, and 306, at average SNR values, the transfer time 320 is lower than a threshold transfer time 324 until the channel utilization increases above a threshold channel utilization 326 of 85%; at low SNR values, the transfer time 340 increases above the threshold transfer time 324 when the channel utilization increases above a threshold channel utilization 346 of 50%; and at very low SNR values, the transfer time 360 remains lower than the threshold transfer time 324 until the channel utilization increases above a threshold channel utilization 366 of 20%. Thus, in one implementation, the threshold signal quality can based on both the SNR and the utilization to achieve a desired threshold transfer time 324. For example, when the SNR values of the RF channel for wireless communication between the host and client devices are moderate (≥30 dBm), the threshold signal quality may be determined by a threshold channel utilization 326 of approximately 85%; when the SNR values of the RF channel for wireless communication between the host and client devices are low (20 dBm<SNR<30 dBm), the threshold signal quality may be determined by a threshold channel utilization 346 of approximately 50%; and when the SNR values of the RF channel for wireless communication between the host and client devices are very low (<20 dBm), the threshold signal quality may be determined by a threshold channel utilization 366 of approximately 20%. In another example implementation, when the SNR values of the RF channel are very low (<20 dBm), the threshold channel utilization may be set to 0%, indicating that at very low SNR, it may be desirable to switch to a different RF channel having a higher signal quality to reduce a risk of disrupting wireless communication between the host and client devices.

In this way, in this example and not as a limitation, the threshold signal quality can depend on a combination of several individual metrics for measuring signal quality. Furthermore, the threshold signal quality can be different for different wireless RF channels. For example, a first RF channel with a moderate SNR may have a first threshold signal quality corresponding to a channel utilization of 85% whereas a second RF channel with a low SNR may have a second threshold signal quality corresponding to a channel utilization of 50%. The threshold signal quality for a particular RF channel may also vary with time since wireless traffic, background noise, and the like, can be dynamic for a particular RF channel. For example, whereas the threshold signal quality may correspond to a first threshold channel utilization (e.g., 50%) when the SNR for a particular RF channel is initially low, the threshold signal quality may be indicated by a higher threshold channel utilization (e.g., 85%) when the SNR for that particular RF channel is moderate at a later point in time. By accounting for differences between RF channels and for the dynamic variability in the signal quality of each RF channel, the threshold signal quality and the wireless communication system can be more adaptive and responsive to changes in the Wi-Fi network environment. As such, continuous wireless communication between host and client devices can be increasingly maintained while reducing a risk of interfering with the Wi-Fi network environment.

Turning now to FIGS. 4, 5, 6, and 9, they illustrate flow charts for wireless communication methods 400, 500, 600, and 900 respectively, for host and client devices in an RF network environment such as RF environment 800. It should be appreciated that these charts are provided for illustrative purposes and are considered non-limiting examples. Variations in implementation of the methods are considered as part of the scope of the disclosure. The methods 400, 500, 600, and 900 represent subroutines that may be executed at a moment in time as instructions on board a computer processor such as a management module 180 residing on the host and/or client devices. As such, methods 400, 500, 600, and 900 may be executed repeatedly while maintaining wireless communication between the host and client devices. Methods 400, 500, 600, and 900 may further obtain input from an operator by way of an input/output device such as a keyboard or touch screen (e.g., operator display 172), and may output data or audio/visual messages to the operator by way of an operator display 172.

Turning now to FIG. 9, as a non-limiting example, a method 900 for wirelessly communicating between host and client devices of a wireless communication system 810 is provided. Method 900 begins at 910 where the management module determines operating parameters of the host and client devices such as the available RF channels, the current RF channel, threshold transmit power, threshold signal quality, and the like. The available RF channels, threshold transmit power and the threshold signal quality may be predetermined quantities corresponding to a geographical location of the RF environment or corresponding to the wireless communication application, and may be user-configured and customized to a particular RF environment. For example, in the case of a hospital network, a subset of RF channels may be made available for accessing the RF environment from host and client devices. Similarly, the WLAN administrator for the hospital network may restrict the transmit power of wireless devices operating in the RF environment to a threshold transmit power. In order to comply with the RF environment protocol, an operator may input the subset of available subset of available RF channels and the threshold transmit power in order to customize and configure the wireless communication system 810 to be compatible with the RF environment, and to reduce a risk of interfering therewith. Defining a set of available RF channels may increase an adaptability and a performance of the wireless communication system 810 by reducing a risk of selecting an unavailable RF channel. Furthermore, defining the subset of available RF channels corresponding to the RF environment may increase a performance of the wireless communication system 810 by reducing a time consumed for scanning the available RF channels.

Continuing with the example, and not as a limitation, at 930, method 900 may continuously scan and determine the signal qualities of available RF channels in the RF environment. Continuously scanning available RF channels can increase the adaptability and responsiveness of the wireless communication in a congested network environment since the management module can maintain a record of the available RF channels having higher signal qualities and those having lower signal qualities. As described above, the set of available RF channels may be predetermined according to a geographical locale of the RF environment, or according to user-prescribed conditions. For example, a WLAN administrator may provide a subset of RF channels available for point-to-point wireless communication between host and client devices. In some implementations, continuously scanning available RF channels may include scanning all RF channels, including unavailable (e.g., restricted RF channels in the RF environment); however unavailable channels may not be selected at step 954 below. Continuously scanning all RF channels, including unavailable RF channels, may simplify the design of the wireless communication system 810, and may reduce a manufacturing cost thereof. As previously explained, determining the signal quality may include measuring one or a combination of wireless communication metrics, RSSI, noise floor, SNR, packet loss, latency, retries, channel utilization, and the like.

Next, at 950, the management module may determine if a current RF channel signal quality utilized for wireless communication between the host and client devices is below the threshold signal quality. In response to the signal quality being less than the threshold signal quality, method 900 continues at 954 where the management module selects one of the available RF channels in the RF environment having a higher signal quality than the other available RF channels. Having continuously monitored the signal qualities of the available RF channels at 930, the management module can promptly select and switch to the RF channel having a higher signal quality than the other available RF channels at 958, thereby reducing a duration for switching to the selected channel, and increasing a transmission rate of wireless communication between the host and client devices. After switching to the selected RF channel, the management module may reduce the transmit power of the host device below the threshold transmit power at step 970, in order to reduce a risk of interfering with wireless communication between other devices utilizing the RF environment. In other examples, the strength of the signal from the communication module 176 and/or any of the plurality of devices 130 and 120 may be lowered to maintain the needed transmission speed but reduce the radiated power to lessen a risk of interfering with the RF environment 800. Returning to 950, for the case where the current RF channel signal quality is greater than the threshold signal quality, at step 980, the management module maintains wireless communication between the host and client devices utilizing the current RF channel. After 970 and 980, method 900 ends.

Figure 4:
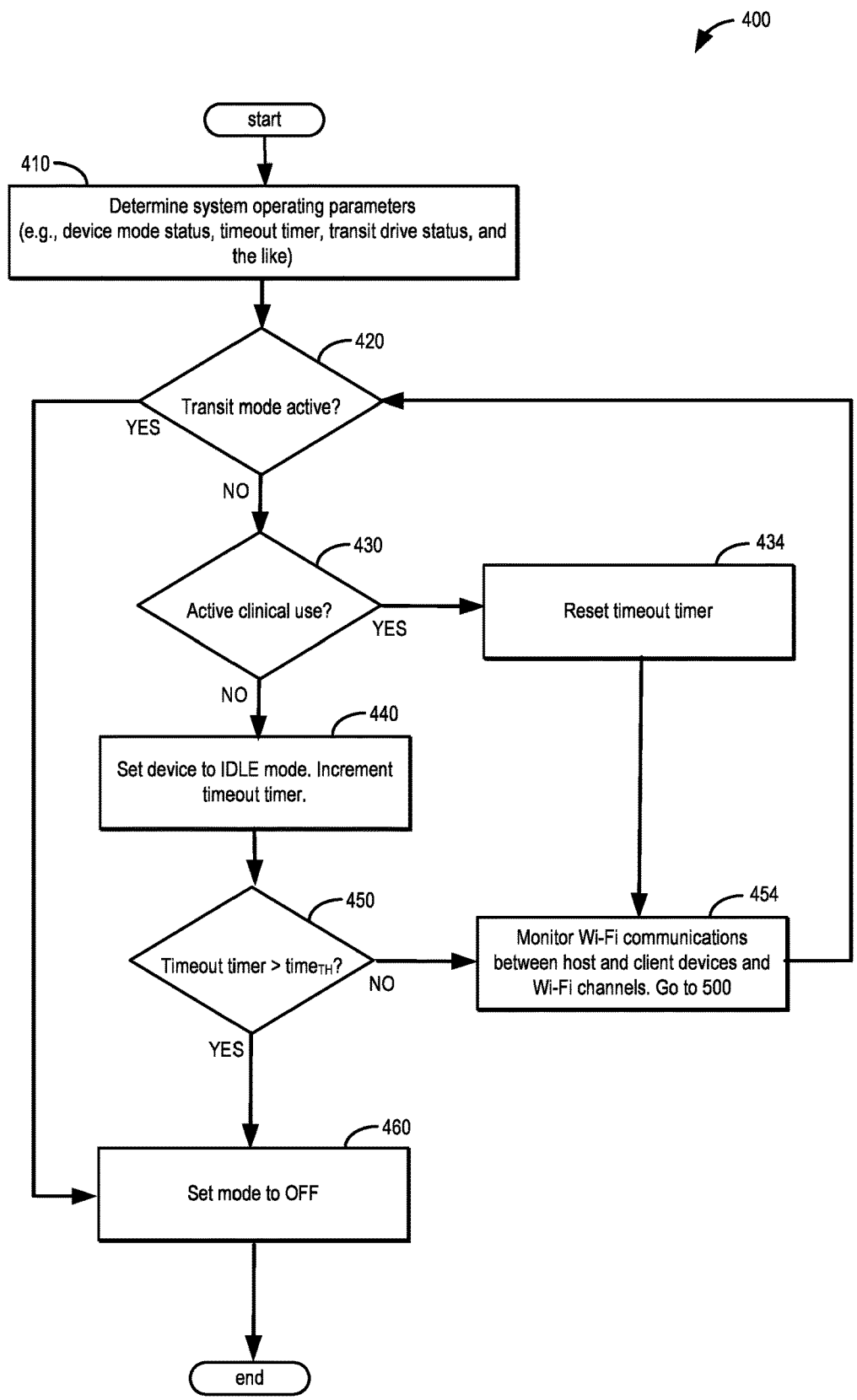
Figure 5:
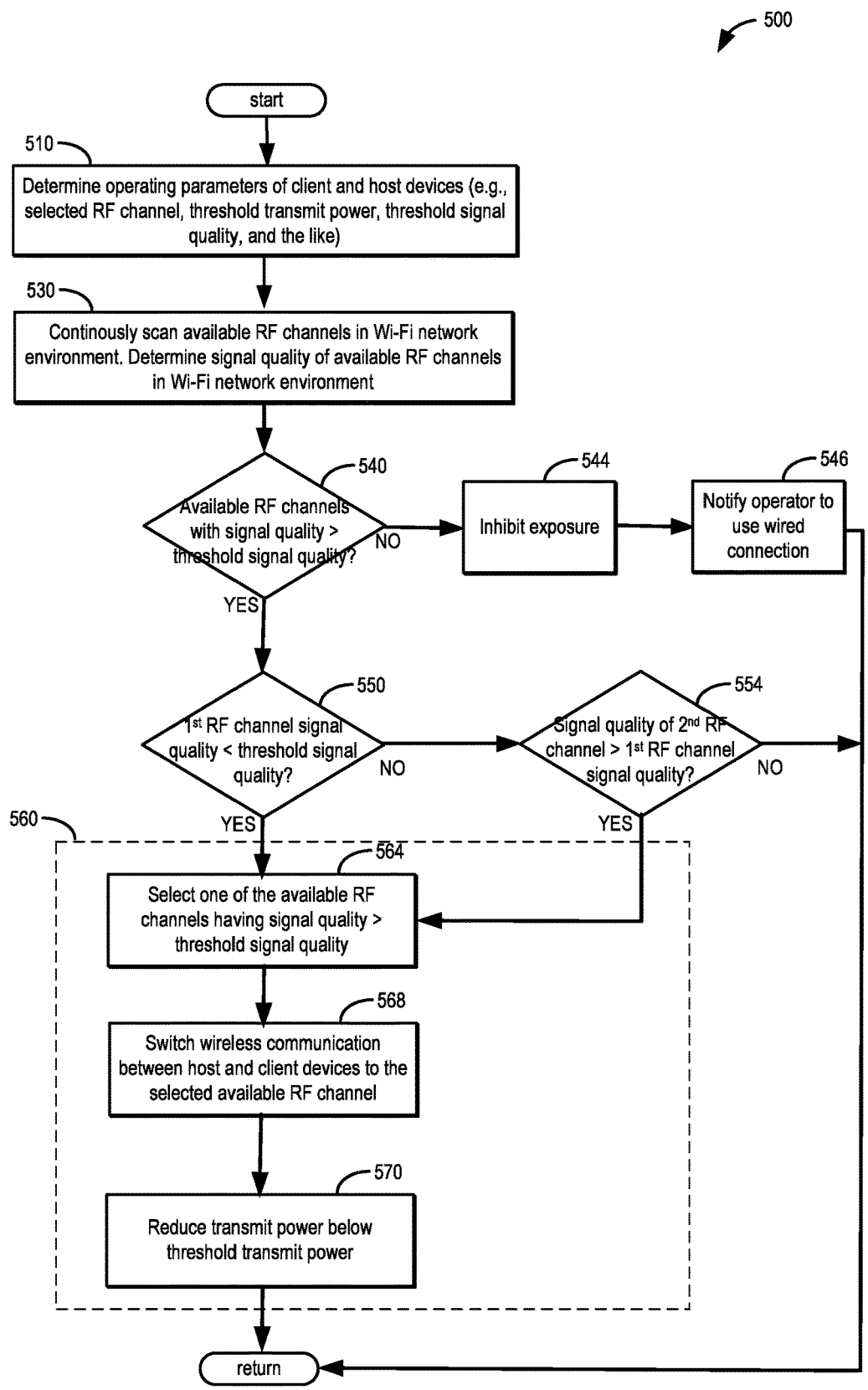

As an example implementation, where in the case where the wireless communication system 100 includes a medical device, the management module 180 may coordinate management of wireless communication with clinical functions. As described above, transmission of clinical data such as X-ray images or ultrasound images may be inhibited during switching of RF channels for wireless communication between host and client devices. Furthermore, monitoring the RF environment and switching RF channels may be deactivated during conditions where medical host and client devices are inactive. In this way, the risk of the host and client devices interfering with and being interfered with by the RF environment can be reduced. Turning now to FIG. 4, it illustrates an example of a wireless communication method 400 for a wireless communication system including host and client medical devices in a hospital network environment. Method 400 begins at 410 where the system operating parameters such as device status, timeout timer, transit drive status, and the like are measured and/or determined by the management module 180. In one implementation, the device status may be on, off, or idle. At 420, method 400 determines if a transit mode is active. The transit mode may be active when a device is being moved (e.g., in transit) or repositioned within the Wi-Fi network environment. For example, for a portable medical device such as a portable X-ray machine, the transit mode may be active when the drive module 174 of the base station 220 is activated. During transit mode, the host and client devices are not clinically active. As such, in response to the transit mode being active at 420, method 400 continues at 460 where the management module 180 sets the device status to OFF. In one example, in response to the transit mode being active, the management module 180 may switch off the Communications Module 176. If the transit mode is not active at 420, method 400 continues at 430 where the management module determines if the host and/or client devices are clinically active. Clinically active may include receiving operator input at the operator display and/or other input/output devices or actively transferring data between the host and client devices. If the host or client devices are clinically active, method 400 continues at 434 where the timeout timer is reset by the management module. Next, at 454 the management module monitors the Wi-Fi communications between the host and client devices and the available RF channels in the Wi-Fi network environment (e.g., method 500).

Returning to 430, for the case where the host and/or client devices are clinically inactive, method 400 continues at 440 where the device status is set to idle by the management module, and the timeout timer is incremented. After 440, method 400 continues at 450 where the management module determines if the timeout timer is greater than a threshold time, time$_{TH}$. The timeout timer indicates a duration for which the host and/or client device status has been idle. The host and client devices are idle when they are clinically inactive and the timeout timer is less than time$_{TH}$. Being clinically inactive may include receiving no input from the operator by way of the operator display or other input/output devices, no data or images transferred between the host and client devices, and the like. The time$_{TH}$ may thus be a duration above which the host and client devices are switched off in order to conserve power and reduce a risk of interfering with the Wi-Fi network environment without disrupting wireless communication between the host and client devices. For the case where the timeout timer is greater than time$_{TH}$, method 400 continues at 460 where the device status is set to off by the management module. After 460, method 400 ends, after which method 400 may be re-executed while wireless communication between the host and client devices is maintained.

Returning to 450, for the case where the timeout timer is not greater than time$_{TH}$, method 400 continues at 454 where the Wi-Fi communications between the host and client devices and the available RF channels in the Wi-Fi network environment are monitored (e.g., method 500) by the management module. Continuing to monitor the available RF channels in the Wi-Fi network environment when the device status is idle is advantageous because upon resuming clinical activity, the device management module 180 may promptly select the available RF channel having a signal quality greater than a threshold signal quality (see method 500). In one implementation, upon resuming active device status mode from idle, the device management module 180 may promptly select the available RF channel with a higher signal quality wherein the signal quality of the other available RF channels is of a lower signal quality. In this way a responsiveness of the wireless communication between the host and client devices may be increased without increasing a risk of disrupting the Wi-Fi network environment. Following execution of step 454, in one implementation, method 400 may return to 420.

Method 500, as another example for illustrative purposes, is executed from 454 and begins at 510 where additional operating parameters such as the selected RF channel, threshold transmit power, threshold signal quality, and the like are determined and/or measured by the management module. In some implementations certain operating parameters such as the threshold transmit power and the threshold signal quality may be predetermined or obtained by the management module by way of operator input at the operator display 172. Method 500 continues at 530 where the Wi-Fi network environment is continuously scanned and monitored by the management module to determine the signal quality of the RF channels. As described above with reference to FIG. 1, the available RF channels may include a set of RF channels broadcast by the Wi-Fi network environment, a subset of RF channels by which the host and client devices may be able to wirelessly communicate, and an operator-configurable subset of RF channels. Continuously scanning and monitoring the signal quality of the RF channels may include repeatedly scanning and monitoring while the host and client devices are active and/or idle.

Continuously scanning the signal quality of the available RF channels when the client and host devices are clinically active is advantageous because the method can be more responsive to selecting and switching to an RF channel having a higher signal quality (e.g., greater than a threshold signal quality) and reducing a risk of selecting or switching to an RF channel having a lower signal quality (e.g., less than a threshold signal quality) in the event that a current signal quality utilized for wireless communication between the host and client devices is degraded or in the event that the host and client devices resume clinical activity from idle or off mode status. Continuously scanning the signal quality of the available RF channels may further be conducted when the host and client devices are in an idle state. Being in an idle state may refer to a status where there has been no data transfer between the client and host devices for less than a threshold duration. In other examples, being in an idle state may further include a status where there has been no operator input detected at the host and/or client devices for less than a threshold duration. Continuously scanning the signal quality of the available RF channels during the idle state may aid in increasing a responsiveness of the wireless communication system in transitioning from idle to active status. For instance, a transition from idle to active status may be faster because upon activation from idle status, the wireless communication system can readily select and switch to an RF channel having a signal quality greater than a threshold signal quality.

Continuously scanning the RF channels in the Wi-Fi network may include actively scanning the RF channels, or passively scanning the RF channels without actively scanning the RF channels. Whereas during an active scan, the client radio transmits a probe request and listens for a probe response from an access point, with a passive scan, the host or client device may listen on each channel for beacons sent periodically by an access point or listening to all packets/transmissions on the network to determine the percentage of network utilization. Although passive scans may be slower than active scans, passive scans can reduce a risk of interfering with the RF environment since additional data (e.g., an active scan probe request and response) is not transmitted on any of the available RF channels. In some implementations where the RF environment is very congested or under conditions where the transmission of data by way of the RF environment is more sensitive to interference, passive scanning without active scanning may be utilized. In other implementations, a combination of active scanning and passive scanning may be carried out in order to increase a responsiveness and reduce a risk of disruption of the wireless communication between the host and client devices. For example, RF channels having a higher signal quality may be actively scanned while RF channels having a lower signal quality may be passively scanned.

Next, at 540, the management module 180 determines if there are any available RF channels having a signal quality greater than the threshold signal quality. As described above with respect to FIGS. 3A-3C, the threshold signal quality may be determined from one or more individual metrics such as RSSI, noise floor, SNR, channel utilization, transfer time, packet loss, retries, latency, and the like. Furthermore, the threshold signal quality may be a dynamic value (e.g., may vary with time as the Wi-Fi traffic on each channel varies) and each RF channel may have a distinct threshold signal quality. If there are no available RF channels with a signal quality greater than the threshold signal quality, method 500 continues at 544, where further exposures (e.g., data transfer between the host and client devices) is inhibited to mitigate a risk of data loss. Following 544, the management module 180 may notify the operator to use a wired connection at 546 because the signal qualities of the available RF channels for wireless communication are less than the threshold signal quality. Returning to 540, if there are available RF channels with a signal quality greater than the threshold signal quality, method 500 continues at 550 where the management module determines if signal quality of a $1^{st}$ RF channel currently utilized for wireless communication between the host and client devices is less than the threshold signal quality. If the signal quality of the $1^{st}$ RF channel is not less than the threshold signal quality, method 500 continues at 554 where the management module determines if the signal quality of a $2^{nd}$ RF channel is greater than the signal quality of the $1^{st}$ RF channel. The $2^{nd}$ RF channel may refer to any other available RF channel different from the $1^{st}$ RF channel. For the case where the signal quality of the $1^{st}$ RF channel is greater than the $2^{nd}$ RF channel (any other available RF channel), method 500 ends and returns to method 400.

Returning to 550, in response to the signal quality of the $1^{st}$ RF channel being less than the threshold signal quality at 550, method 500 continues at 560 where the management module 180 executes a series of steps to switch wireless communication between the host and client devices from the $1^{st}$ RF channel to a different RF channel having a signal quality greater than the threshold signal quality. Having continuously monitored the available RF channels at 530, the management module can promptly select an RF channel with a signal quality greater than the threshold signal quality, thereby reducing a risk of disrupting wireless communication between the host and client devices while simultaneously reducing a risk of interfering with the Wi-Fi network environment. Furthermore, selecting the available RF channel may comprise selecting the RF channel wherein each of the other available RF channels has a lower signal quality than the selected available RF channel. In other words, having continuously monitored the available RF channels at 530, the management module 180 may promptly select the available RF channel having the highest signal quality of the available RF channels.

Returning to 554, in response to the signal quality of the $2^{nd}$ RF channel being greater than the $1^{st}$ RF channel signal quality, method 500 continues at 560 where the management module 180 executes a series of steps to switch wireless communication between the host and client devices from the $1^{st}$ RF channel to the $2^{nd}$ RF channel. Having continuously monitored the available RF channels at 530, the management module can promptly select an RF channel with a signal quality greater than the threshold signal quality, thereby reducing a risk of disrupting wireless communication between the host and client devices while simultaneously reducing a risk of interfering with the Wi-Fi network environment. Furthermore, selecting the 2nd RF channel at 564 may include selecting an RF channel with a signal quality greater than the $1^{st}$ RF channel signal quality by a threshold amount. Selecting an RF channel with a signal quality greater than the $1^{st}$ RF channel signal quality by a threshold amount may aid in reducing switching to an available RF channel providing a negligible increase in signal quality. In other words, the management module 180 may attempt to switch to a new RF channel if the potential improvement in signal quality is substantial. In this way, data transfer rates can be maintained or increased while reducing a risk of disrupting wireless communication between host and client devices. Further still, selecting the $2^{nd}$ RF channel may comprise selecting the RF channel wherein each of the other available RF channels has a lower signal quality than the selected available RF channel. In other words, having continuously monitored the available RF channels at 530, the management module 180 may promptly select the available RF channel having the highest signal quality of the available RF channels.

At 568, the management module may switch wireless communication between the host and client devices to the selected available RF channel. Switching wireless communication between the host and client devices to the selected available RF channel can include sending a channel switch request between the host and client devices, exchanging a number of synchronization packages between the host and client devices on the new RF channel, and transmitting beacons on the new RF channel to allow communication with the client device to be reestablished.

Next, method 500 continues at 570 where the management module may optionally reduce the transmit power below a threshold transmit power. Reducing the transmit power below the threshold transmit power may reduce a risk of interfering with and disrupting wireless communication on the Wi-Fi network. The threshold transmit power may be predetermined and/or user-configured, and each RF channel may have a corresponding threshold transmit power. As non-limiting examples, a threshold transmit power may be 5, 8, 11, 14, 17, 20, or 23 dBm. In other examples, the transmit power may be set according to a geographical region, a type of Wi-Fi network environment, or the level of congestion of the Wi-Fi network. For example, a congested hospital network may more severely restrict both the available number of RF channels and the threshold transmit power thereon. In another example, the threshold transmit power may be selected based on the signal quality metrics of a channel. For instance, to decrease a risk of low SNR, transmit power may be increased. Furthermore, raising a threshold transmit power may allow for wireless communication at higher RSSI, which can raise the threshold signal quality and thereby increase data transfer rates while reducing a risk of disruption of wireless communication between the host and client devices.

Figure 6:
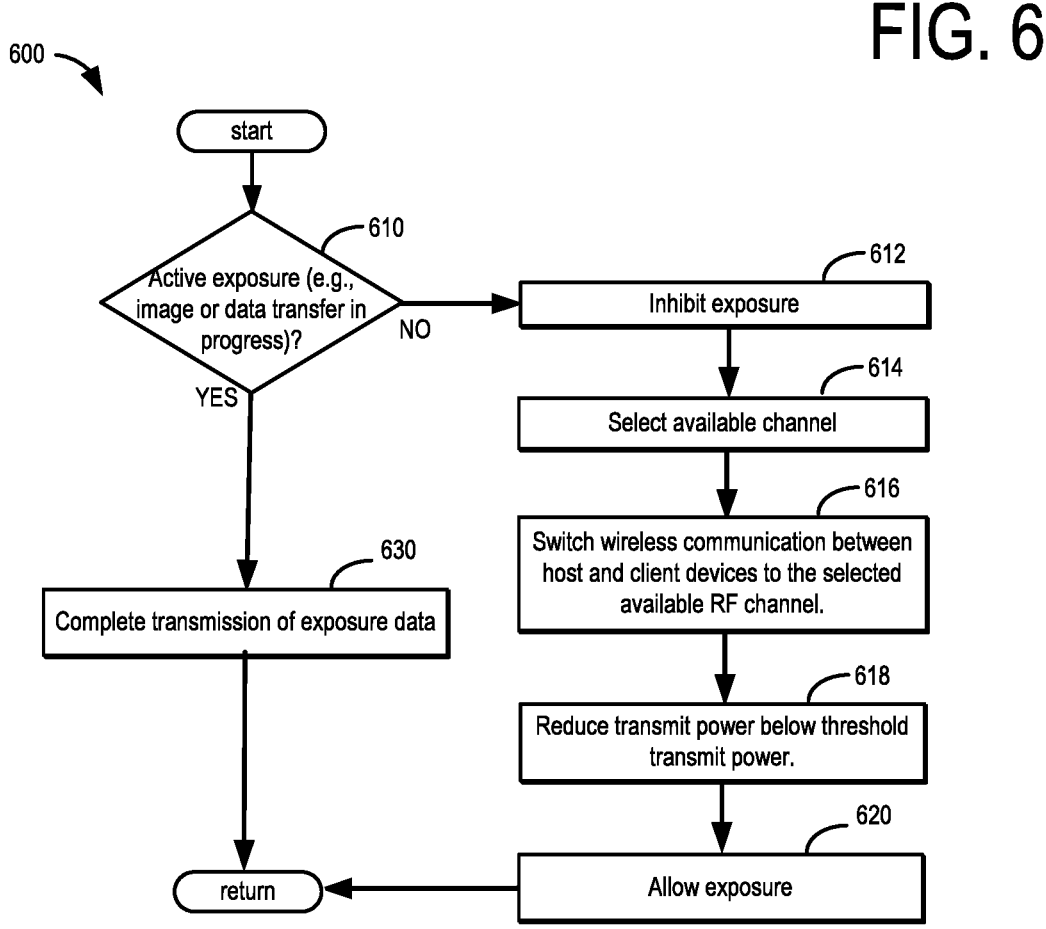

Turning now to FIG. 6, as another non-limiting example for illustrative purposes, a method 600 of another example implementation is provided from 560 for switching wireless communication between the host and client devices from the $1^{st}$ RF channel to a different RF channel having a signal quality greater than the threshold signal quality. Method 600 may be executed by the management module 180 following steps 550 and 554 of method 500. Method 600 begins at 610, the management module 180 determines if there is an active exposure. An active exposure may include actively transferring an image or other clinical data between the host and client medical devices. For example, an active exposure may include transferring an X-ray image, and ultrasound image, or patient medical data between a client and host device. If the management module determines that there is a current active exposure, method 600 continues at 630 where the management module 180 completes the transmission of exposure data in order to mitigate a risk of losing clinical data.

Returning to 610, for the case where there is no active exposure, the method 600 continues at 612 where the management module 180 inhibits further exposures between the host and client devices. Inhibiting exposures may include disallowing requests for data transfer during the duration where the wireless communication between the host and client devices is switched from the current $1^{st}$ RF channel to the new selected (e.g., $2^{nd}$) RF channel. Next, method 600 continues at steps 614 to select the available channel, 616 to switch wireless communication between the host and client devices to the selected available RF channel, and 618 to reduce transmit power below the threshold transmit power. Steps 614, 616, and 618 may be executed similarly to steps 564, 568, and 570 of method 500. After 618, method 600 continues at 620 where the management module 180, after completing the switch from the 1$^{st}$ RF channel to the 2$^{nd}$ RF channel, resumes allowing exposures between the host and client devices. Method 620 returns to method 500 after 620.

Turning now to FIG. 7, a non-limiting example is provided illustrating a timeline 700 for executing a wireless communication method such as methods 400, 500, 600, and 900 by a wireless communication system such as wireless communication systems 100, 210, 250, and 810. Examples of wireless communication systems 100, 210, 250, and 810 may include but are not limited to portable and non-portable medical devices such as X-ray stations, ultrasound stations, and patient monitoring systems. Other examples of wireless communication systems 100, 210, 250, and 810 may include but are not limited to portable and non-portable non-medical devices. Timeline 700 plots trend lines for device status 710, 1$^{st}$ RF channel signal quality 720, 2$^{nd}$ RF channel signal quality, transmit power 730, exposure status 740, timeout timer 760, and the selected RF channel 770 for wireless communication between the host and client devices within the Wi-Fi network environment. Also shown are the 1$^{st}$ RF channel threshold signal quality 722, 2$^{nd}$ RF channel signal quality 728, 1$^{st}$ RF channel threshold transmit power 732, 2$^{nd}$ RF channel threshold transmit power 738, and threshold time 762. In the example implementation of timeline 700, two available RF channels are illustrated for clarity, however implementations with more than two available RF channels may also be included without departing from the scope of the disclosure.

Prior to time t1, the host and client devices of the wireless communication system are active, communicating wirelessly by way of a 1$^{st}$ RF channel in a Wi-Fi network environment. Because the 1$^{st}$ RF channel signal quality 720 is greater than the 1$^{st}$ RF channel threshold signal quality 722, the exposure status is allow, as management module is permitting continuous exposures (e.g., wireless data transfer) between the host and client devices; meanwhile, the timeout timer 760 is 0. The management module also reduces the transmit power 730 of the host and client devices below the 1$^{st}$ RF channel threshold transmit power 732 to decrease a risk of interference with the Wi-Fi network. When the device status is active or idle, the management module continuously monitors the signal quality of the available RF channels. As described above, continuously monitoring the available RF channels may include passively scanning the available RF channels, and passively scanning without actively scanning the available RF channels. At time t1, responsive to the 1$^{st}$ RF channel signal quality 720 decreasing below the 1$^{st}$ RF channel threshold signal quality 722, the management module selects the 2$^{nd}$ RF channel 770 upon determining that the 2$^{nd}$ RF channel signal quality 726 is greater than the 1$^{st}$ RF channel signal quality 720 by a threshold amount and greater than the 2$^{nd}$ threshold signal quality 728. Before switching to the 2$^{nd}$ RF channel, the management module sets the exposure status 740 to inhibit to inhibit further data transfer between the host and client devices during the channel switch, thereby reducing a risk of data loss. Furthermore, the management module reduces the transmit power 730 below the 2$^{nd}$ RF channel threshold transmit power 738 in order to reduce a risk of interfering with the Wi-Fi network environment. After the switch to the 2$^{nd}$ RF channel is completed, the management module reactivates the exposure status 740 to allow continued wireless transmission of data between the host and client devices on the 2$^{nd}$ RF channel.

At time t4, the 2$^{nd}$ RF channel signal quality 726 decreases below the 2$^{nd}$ RF channel threshold signal quality 728, during which the 1$^{st}$ RF channel signal quality 720 is less than the 1$^{st}$ RF channel threshold signal quality 722. In response to no available RF channels being greater than the threshold signal quality, the management module sets the exposure status 740 to inhibit to mitigate data loss. The management module may also send a notification by way of the operator interface to inform the operator of the low signal quality of each available RF channel, and to recommend utilizing a wired connection for transferring data between the host and client devices. At time t6, due inactivity of the host and client devices, the device status 710 becomes idle, and the timeout timer 760 begins to increment. At time t7, the timeout timer 760 reaches the threshold timeout timer, and the device status switches to off.

At time t8, the host and client devices are reactivated, the device status 710 becomes active, and the timeout timer 760 is reset. The host and client devices begin wirelessly communicating by way of the 1$^{st}$ RF channel at a transmit power 730 below the 1$^{st}$ threshold transmit power 732. Both the 1$^{st}$ RF channel signal quality 720 and the 2$^{nd}$ RF channel signal quality 726 are greater than the 1$^{st}$ RF channel threshold signal quality 722 and the 2$^{nd}$ RF channel threshold signal quality 728. At time t9, in response to the 2$^{nd}$ RF channel signal quality being greater than the 1$^{st}$ RF channel signal quality, the management module 180 selects the 2$^{nd}$ RF channel and switches wireless communication between the host and client devices from the 1$^{st}$ RF channel to the 2$^{nd}$ RF channel. To facilitate the channel switch while reducing a risk of losing data, the management module momentarily inhibits the exposure status 740 of the host and client devices at t9.

In this manner, a wireless communication method for a host device in a radio frequency (RF) environment may include communicating wirelessly between the host device and a client device by way of a first RF channel, and continuously scanning available RF channels of the RF environment. In response to a first RF channel signal quality decreasing below a threshold signal quality, the method may select one of the available RF channels having a signal quality greater than the threshold signal quality, and switch wireless communication between the client device and the host device from the first RF channel to the selected available RF channel. In one example, continuously scanning the available RF channels includes passively scanning the available RF channels. Furthermore, the method of claim may further include determining a threshold transmit power of the selected available RF channel, and reducing the transmit power of the host device below the threshold transmit power. In one case, determining the threshold transmit power includes obtaining a user-input threshold transmit power. Furthermore, selecting one of the available RF channels can include selecting one of the available RF channels, wherein each of the other available RF channels has a lower signal quality than the selected available RF channel.

The method may further include obtaining a user-input set of available RF channels, wherein continuously scanning the available RF channels comprises continuously scanning the user-input set of available RF channels without scanning RF channels outside the user-input set of available RF channels. Furthermore, in response to the first RF channel signal quality decreasing below the threshold signal quality, the a signal strength transmitted by the host device may be reduced after switching wireless communication between the client device and the host device from the first RF channel to the selected available RF channel. Further still, in response to a second RF channel signal quality of a second RF channel being greater than the first RF channel signal quality, wireless communication between the client device and the host device may be switched from the first RF channel to the second RF channel, wherein the available RF channels includes the second RF channel.

In another embodiment, and as a non-limiting illustration, a wireless communication system for a medical device can include a client device, a host device in wireless communication over a first radio frequency (RF) channel with the client device within an RF environment, and a management module. The management module may include executable instructions thereon to continuously scan a plurality of RF channels of the RF environment, the plurality of RF channels including the first RF channel and a second RF channel, and in response to a second RF channel signal quality being greater than a first RF channel signal quality, switch wireless communication between the client device and the host device from the first RF channel to the second RF channel. In some examples, each of the other plurality of RF channels comprise a lower RF channel signal quality than the second RF channel signal quality. Furthermore, the executable instructions may include, in response to the first RF channel signal quality being less than a threshold signal quality, switching wireless communication between the client device and the host device from the first RF channel to the second RF channel. Further still, the executable instructions can include, inhibiting data transfer between the host device and the client device in response to the signal quality of each of the plurality of RF channels being less than the threshold signal quality. Further still, the executable instructions can include, notifying the operator to utilize a wired connection between the host device and the client device in response to the signal quality of each of the plurality of RF channels being less than the threshold signal quality. In one implementation, the host device may comprise a portable medical device with a motion detection system, the motion detection system being engaged when repositioning the portable medical device. Furthermore, the executable instructions may comprise switching off the transmit power from the host device in response to engaging the motion detection system.

In another embodiment, a wireless communication method for a host device in a Wi-Fi network environment may include conducting wireless communication between a client device and the host device by way of a first radio frequency (RF) channel, and continuously monitoring a signal quality of a plurality of RF channels of the Wi-Fi network environment, the plurality of RF channels including the first RF channel and a second RF channel. Furthermore, in response to a first RF channel signal quality decreasing below a threshold signal quality, wireless communication between the client device and the host device may be switched from the first RF channel to the second RF channel wherein a second RF channel signal quality is greater than the threshold signal quality. In one example, monitoring the signal quality of the plurality of RF channels may include determining a signal-to-noise ratio of each of the plurality of RF channels. Furthermore, the first RF channel signal quality decreasing below the threshold signal quality can include a first RF channel signal-to-noise ratio decreasing below a threshold signal-to-noise ratio. In another example, monitoring the signal quality of the plurality of RF channels can include determining a channel utilization of each of the plurality of RF channels. Furthermore, the first RF channel signal quality decreasing below the threshold signal quality can include the first RF channel utilization increasing above a threshold channel utilization. In one implementation, the threshold channel utilization may be increased responsive to an increase in the first RF channel signal-to-noise ratio, and the threshold signal-to-noise ratio may be increased responsive to an increase in the first RF channel utilization. In another example, monitoring the signal quality of the plurality of RF channels can include determining a noise floor of each of the plurality of RF channels. Furthermore, the first RF channel signal quality decreasing below the threshold signal quality can include a first RF channel noise floor increasing above a threshold noise floor. In another example, monitoring the signal quality of the plurality of RF channels comprises determining a latency of each of the plurality of RF channels. Furthermore, the first RF channel signal quality decreasing below the threshold signal quality may include a first RF channel latency increasing above a threshold latency.

In this way, the technical effect of reducing interference with the Wi-Fi network environment while reducing a risk of disrupting the point-to-point wireless communication between the host device and the client device can be achieved. In particular, by continuously scanning available RF channels, a responsiveness of the wireless communication method can be increased because the selected available channel to which the host-client wireless communication is switched has a high signal quality. Furthermore, continuously scanning available RF channels can increase the adaptability of the wireless communication in a congested network environment since the method is not restricted to selecting an unused RF channel; existing RF channels within the network environment may be selected as long as the signal quality is adequate. Further still, continuously monitoring available channels in the Wi-Fi network environment may increase a robustness of the wireless communication method since RF channels that tend to have poor signal quality can be avoided. Further still, wireless local area network (WLAN) administrators of the Wi-Fi network environment may be more receptive to permitting use of the host and client devices within the Wi-Fi network environment because a risk of interfering with wireless communication between other devices within the Wi-Fi network is reduced. Further still, the systems and methods described herein allow for wireless communication between the host and client devices to be flexibly customized to and compliant when operating within Wi-Fi environments where the number of available channels for wireless communication is restricted (e.g., geographic or user-defined restrictions) to a subset of channels by the WLAN administrator.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A wireless communication method for a host device in a radio frequency (RF) environment, comprising:
communicating wirelessly between the host device and a client device by way of a first RF channel;
continuously scanning available RF channels of the RF environment; and
in response to a first RF channel signal quality decreasing below a threshold signal quality,
selecting one of the available RF channels having a signal quality greater than the threshold signal quality,
switching wireless communication between the client device and the host device from the first RF channel to the selected available RF channel;
wherein the host device includes an imaging medical device and wherein imaging operation of the imaging medical device is inhibited during switching of wireless communication from the first RF channel to the selected available RF channel.

2. The method of claim 1, wherein continuously scanning the available RF channels comprises passively scanning the available RF channels.

3. The method of claim 2, further comprising determining a threshold transmit power of the selected available RF channel, and reducing the transmit power of the host device below the threshold transmit power.

4. The method of claim 3, wherein determining the threshold transmit power comprises obtaining a user-input threshold transmit power.

5. The method of claim 4, wherein selecting one of the available RF channels comprises selecting one of the available RF channels, wherein each of the other available RF channels has a lower signal quality than the selected available RF channel.

6. The method of claim 5, further comprising, obtaining a user-input set of available RF channels, wherein continuously scanning the available RF channels comprises continuously scanning the user-input set of available RF channels without scanning RF channels outside the user-input set of available RF channels.

7. The method of claim 6, further comprising, in response to the first RF channel signal quality decreasing below the threshold signal quality,
reducing a signal strength transmitted by the host device after switching wireless communication between the client device and the host device from the first RF channel to the selected available RF channel.

8. The method of claim 7 further comprising, in response to a second RF channel signal quality of a second RF channel being greater than the first RF channel signal quality, switching wireless communication between the client device and the host device from the first RF channel to the second RF channel, wherein the available RF channels includes the second RF channel.

9. A wireless communication system for a medical device, comprising:
a client device;
a host device in wireless communication over a first radio frequency (RF) channel with the client device within an RF environment; and
a processor programmed to,
continuously scan a plurality of RF channels of the RF environment, the plurality of RF channels including the first RF channel and a second RF channel;
in response to a second RF channel signal quality being greater than a first RF channel signal quality,
switch wireless communication between the client device and the host device from the first RF channel to the second RF channel;
wherein the host device includes an imaging medical device and wherein imaging operation of the imaging medical device is inhibited during switching of wireless communication from the first RF channel to the secomd RF channel.

10. The wireless communication system of claim 9, wherein each of the other plurality of RF channels comprise a lower RF channel signal quality than the second RF channel signal quality.

11. The wireless communication system of claim 10, wherein the executable instructions further include, in response to the first RF channel signal quality being less than a threshold signal quality, switching wireless communication between the client device and the host device from the first RF channel to the second RF channel.

12. The wireless communication system of claim 11, wherein the executable instructions further include, inhibiting data transfer between the host device and the client device in response to the signal quality of each of the plurality of RF channels being less than the threshold signal quality.

13. The wireless communications system of claim 12, wherein the executable instructions further include, notifying the operator to utilize a wired connection between the host device and the client device in response to the signal quality of each of the plurality of RF channels being less than the threshold signal quality.

14. The wireless communications system of claim 13, wherein
the host device comprises a portable medical device with a motion detection system, the motion detection system being engaged when repositioning the portable medical device, and
the executable instructions further comprise switching off the transmit power from the host device in response to engaging the motion detection system.

15. A wireless communication method for a host device in a Wi-Fi network environment, comprising:
conducting wireless communication between a client device and the host device by way of a first radio frequency (RF) channel;
continuously monitoring a signal quality of a plurality of RF channels of the Wi-Fi network environment, the plurality of RF channels including the first RF channel and a second RF channel;
in response to a first RF channel signal quality decreasing below a threshold signal quality,
switching wireless communication between the client device and the host device from the first RF channel to the second RF channel wherein a second RF channel signal quality is greater than the threshold signal quality;

wherein the host device includes an imaging medical device and wherein imaging operation of the imaging medical device is inhibited during switching of wireless communication from the first RF channel to the second RF channel.

16. The method of claim 15, wherein,
monitoring the signal quality of the plurality of RF channels comprises determining a signal-to-noise ratio of each of the plurality of RF channels, and
the first RF channel signal quality decreasing below the threshold signal quality comprises a first RF channel signal-to-noise ratio decreasing below a threshold signal-to-noise ratio.

17. The method of claim 16, wherein,
monitoring the signal quality of the plurality of RF channels comprises determining a channel utilization of each of the plurality of RF channels and,
the first RF channel signal quality decreasing below the threshold signal quality further comprises the first RF channel utilization increasing above a threshold channel utilization.

18. The method of claim 17, wherein the threshold channel utilization is increased responsive to an increase in the first RF channel signal-to-noise ratio, and wherein the threshold signal-to-noise ratio is increased responsive to an increase in the first RF channel utilization.

19. The method of claim 15, wherein,
monitoring the signal quality of the plurality of RF channels comprises determining a noise floor of each of the plurality of RF channels and,
the first RF channel signal quality decreasing below the threshold signal quality further comprises a first RF channel noise floor increasing above a threshold noise floor.

20. The method of claim 15, wherein,
monitoring the signal quality of the plurality of RF channels comprises determining a latency of each of the plurality of RF channels and,
the first RF channel signal quality decreasing below the threshold signal quality further comprises a first RF channel latency increasing above a threshold latency.

21. A wireless communication method for a host device in a radio frequency (RF) environment, comprising:
communicating wirelessly between the host device and a client device by way of a first RF channel;
continuously scanning available RF channels of the RF environment; and
in response to a first RF channel signal quality decreasing below a threshold signal quality,
selecting one of the available RF channels having a signal quality greater than the threshold signal quality,
switching wireless communication between the client device and the host device from the first RF channel to the selected available RF channel;
wherein the signal quality comprises a channel utilization and wherein the threshold signal quality comprises a threshold channel utilization; and
wherein the threshold channel utilization is increased responsive to an increase in a first RF channel signal-to-noise ratio.

* * * * *